US012652259B1

(12) United States Patent
Bardin et al.

(10) Patent No.: US 12,652,259 B1
(45) Date of Patent: Jun. 9, 2026

(54) QUANTUM CONTROL SIGNAL GENERATION

(71) Applicant: Google LLC, Mountain View, CA (US)

(72) Inventors: Joseph Cheney Bardin, Amherst, MA (US); Seyed Mohammadreza Fatemi, Santa Barbara, CA (US)

(73) Assignee: Google LLC, Mountain View, CA (US)

( * ) Notice: Subject to any disclaimer, the term of this patent is extended or adjusted under 35 U.S.C. 154(b) by 683 days.

(21) Appl. No.: 18/110,779

(22) Filed: Feb. 16, 2023

(51) Int. Cl.
 H04L 49/10 (2022.01)
 G06N 10/20 (2022.01)
(52) U.S. Cl.
 CPC ............. H04L 49/10 (2013.01); G06N 10/20 (2022.01)
(58) Field of Classification Search
 CPC ..... H04L 49/10; H04L 49/102; H04L 49/103; H04L 25/026; G06N 10/20; G06N 10/40; H03K 17/164; H03K 19/00; H03K 19/0013; H03K 19/0185; H03K 19/018507; H03K 19/018521; H03K 19/018557; H03K 19/018585; H03K 19/00315; H03K 19/00361
 See application file for complete search history.

(56) References Cited

U.S. PATENT DOCUMENTS

2024/0137027 A1 * 4/2024 Rylov .................. H03K 19/195

* cited by examiner

*Primary Examiner* — Jung Kim
(74) *Attorney, Agent, or Firm* — Fish & Richardson P.C.

(57) ABSTRACT
A circuit device includes a plurality of driver circuits, each driver circuit configured to output a respective current, and a switch network including a plurality of switch network inputs. Each switch network input of the plurality of switch network inputs is coupled to an output of a respective driver circuit of the plurality of driver circuits to receive the respective current from the respective driver circuit, a switch network output, one or more control inputs, and a plurality of switches. The switch network is configured to adjust one or more switches of the plurality of switches to provide, to a quantum computing circuit at the switch network output, an output signal including a sum of a subset of the currents from the plurality of driver circuits, the subset of the currents corresponding to the one or more control signals.

27 Claims, 17 Drawing Sheets

QUANTUM CONTROL SIGNAL GENERATION

FIELD OF THE DISCLOSURE

The present disclosure relates to signal generation circuits.

BACKGROUND

Quantum processors incorporate control signals to control qubit operation and qubit-qubit couplings. Qubits and other quantum devices can be controlled using signals provided to or coupling to the devices.

SUMMARY

Some aspects of this disclosure describe a circuit device. The circuit device includes a plurality of driver circuits, each driver circuit configured to output a respective current; and a switch network. The switch network includes a plurality of switch network inputs. Each switch network input of the plurality of switch network inputs is coupled to an output of a respective driver circuit of the plurality of driver circuits to receive the respective current from the respective driver circuit. The switch network includes a switch network output, one or more control inputs, and a plurality of switches. The switch network is configured to, based on one or more control signals at the one or more control inputs, adjust one or more switches of the plurality of switches to provide, at the switch network output, an output signal including a sum of a subset of the currents from the plurality of driver circuits, the subset of the currents corresponding to the one or more control signals. The circuit device further includes a quantum computing circuit coupled to the switch network output to receive the output signal.

This and other circuit devices described herein can have one or more of at least the following characteristics.

In some implementations, the switch network is configured to, in response to one or more first control signals at the one or more control inputs, set a first switch of the plurality of switches to a first configuration to include a first current, from a first driver circuit of the plurality of driver circuits, in the subset of the currents, and, in response to one or more second control signals at the one or more control inputs, set the first switch to a second configuration to exclude the first current from the subset of the currents.

In some implementations, a switching time for switching between the first configuration and the second configuration is less than 2 ns.

In some implementations, the switch network is configured to, in response to one or more control signals at the one or more control inputs, adjust the one or more switches of the plurality of switches to generate, as the output signal, a pulse having a rise time or fall time less than 2 ns.

In some implementations, the plurality of driver circuits and the switch network are configured to generate the pulse based on DC currents from the plurality of driver circuits.

In some implementations, the plurality of driver circuits and the switch network are configured to, when operated at a cryogenic temperature, provide the output signal with a noise component less than 1-10-5 times a total value of the output signal.

In some implementations, at least two driver circuits of the plurality of driver circuits include a respective digital to analog converter (DAC).

In some implementations, a first driver circuit of the plurality of driver circuits is configured to, when operated at a cryogenic temperature, output a respective current having a dominant noise component associated with a resistance of the first driver circuit.

In some implementations, the quantum computing circuit includes a qubit arranged to receive a magnetic flux associated with the output signal.

In some implementations, the circuit device includes a controller coupled to the one or more control inputs. The controller is configured to provide, at the one or more control inputs, control signals that cause the switch network to adjust the one or more switches to switch between: a first setting in which the output signal includes a sum of a first subset of the currents, the first setting causing the qubit to have a first frequency associated with single-qubit gate operation, a second setting in which the output signal includes a sum of a second subset of the currents, the second setting causing the qubit to have a second frequency associated with two-qubit gate operation, a third setting in which the output signal includes a sum of a third subset of the currents, the third setting causing the qubit to have a third frequency associated with qubit readout, and a fourth setting in which the output signal includes a sum of a fourth subset of the currents, the fourth setting causing the qubit to have a fourth frequency associated with qubit reset.

In some implementations, the quantum computing circuit includes a filter coupled between the qubit and the switch network output.

In some implementations, a first switch of the plurality of switches includes a pair of balanced switch networks.

In some implementations, a first driver circuit of the plurality of driver circuits includes a plurality of programmable current sources. The respective current output by the first driver circuit includes a combination of respective outputs from the plurality of programmable current sources.

In some implementations, a first driver circuit of the plurality of driver circuits includes a low dropout (LDO) regulator circuit configured to output a reference voltage; a programmable digital to analog converter (DAC) circuit configured to generate a reference signal based on the reference voltage; and a front-end circuit configured to receive the reference signal and output the respective current from the first driver circuit based on the reference signal.

In some implementations, the DAC circuit is configured to generate a reference current as the reference signal, and the front-end circuit is configured such that the respective current from the first driver circuit varies with varying values of the reference current.

In some implementations, the front-end circuit includes at least one switch, and wherein a signal from the DAC circuit or a controller distinct from the DAC circuit adjusts a configuration of the at least one switch.

In some implementations, the front-end circuit includes a transistor, and at least one resistor coupled directly to a source terminal or a drain terminal of the transistor.

In some implementations, the front-end circuit includes a capacitor coupled between (i) the source terminal or the drain terminal and (ii) a ground terminal, or a gate terminal of the transistor.

In some implementations, the front-end circuit includes: a first sub-block coupled between the DAC circuit and a supply voltage, wherein the reference signal includes a current between the first sub-block and the DAC circuit, and a second sub-block coupled between the supply voltage and a front-end circuit output terminal, wherein the second sub-block is configured to output the respective current from the first driver circuit at the front-end circuit output terminal, and wherein a gate terminal of a transistor of the second sub-block is arranged to receive a signal from the first sub-block.

In some implementations, the front-end circuit includes an output line on which the respective current from the first driver circuit is output, and a resistor on the output line.

In some implementations, the circuit device includes an adjustable resistor network on the output line, the adjustable resistor network including the resistor.

In some implementations, the front-end circuit includes an operational amplifier including a first stage and a second stage. The first stage of the operational amplifier includes a current source that biases the first stage with a current less than 1 µA.

In some implementations, the DAC circuit includes a resistive DAC.

In some implementations, the front-end circuit includes a plurality of output stages, each output stage configured to output a respective first current. The DAC circuit is configured to generate the reference signal to select a subset of the plurality of output stages to generate the respective current from the first driver circuit, the respective current from the first driver circuit including a sum of the respective first currents of the subset of the plurality of output stages.

In some implementations, the quantum computing circuit includes an adjustable resistor network coupled to the switch network output.

In some implementations, a current path from the plurality of driver circuits to the quantum computing circuit has less than five times current attenuation.

In some implementations, the respective currents from the plurality of driver circuits originate at a cryogenic temperature.

Some aspects of this disclosure describe a method. The method includes generating a plurality of driver currents; providing the plurality of driver currents as inputs into a switch network; adjusting one or more switches of a plurality of switches of the switch network to provide, at a switch network output, an output signal including a sum of a subset of the driver currents; and controlling a quantum device using the output signal.

This and other described methods can have one or more of at least the following characteristics.

In some implementations, adjusting the one or more switches includes setting a first switch of the plurality of switches to a first configuration to include a first driver current, from a first driver circuit, in the subset of the driver currents; and setting the first switch to a second configuration to exclude the first current from the subset of the driver currents.

In some implementations, adjusting the one or more switches includes adjusting the one or more switches to generate, as the output signal, a pulse having a rise time or fall time less than 2 ns.

In some implementations, the method includes generating the pulse based on DC driver currents.

In some implementations, the method includes providing less than five times current attenuation along a current path from a source of the plurality of driver currents to the quantum device.

In some implementations, the method includes providing less than two times current attenuation along the current path.

In some implementations, the method includes generating the plurality of driver currents such that the plurality of driver currents originate at a cryogenic temperature.

In some implementations, the method includes setting a value of a first driver current of the plurality of driver currents using a first digital to analog converter (DAC) included in a first driver circuit; and setting a value of a second driver current of the plurality of driver currents using a second DAC included in a second driver circuit.

In some implementations, the quantum device includes a qubit, and controlling the quantum device includes setting a frequency of the qubit.

In some implementations, adjusting the one or more switches includes switching the switch network between: a first setting in which the output signal includes a sum of a first subset of the driver currents, the first setting causing the qubit to have a first frequency associated with single-qubit gate operation, a second setting in which the output signal includes a sum of a second subset of the driver currents, the second setting causing the qubit to have a second frequency associated with two-qubit gate operation, a third setting in which the output signal includes a sum of a third subset of the driver currents, the third setting causing the qubit to have a third frequency associated with qubit readout, and a fourth setting in which the output signal includes a sum of a fourth subset of the driver currents, the fourth setting causing the qubit to have a fourth frequency associated with qubit reset.

In some implementations, a first driver circuit includes an operational amplifier including a first stage and a second stage, and the method includes biasing the first stage with a current less than 1 µA, to generate a first driver current of the plurality of driver currents.

The details of one or more implementations are set forth in the accompanying drawings and the description below. Other aspects, features and advantages will be apparent from the description and drawings, and from the claims.

DETAILED DESCRIPTION

Figure 1:
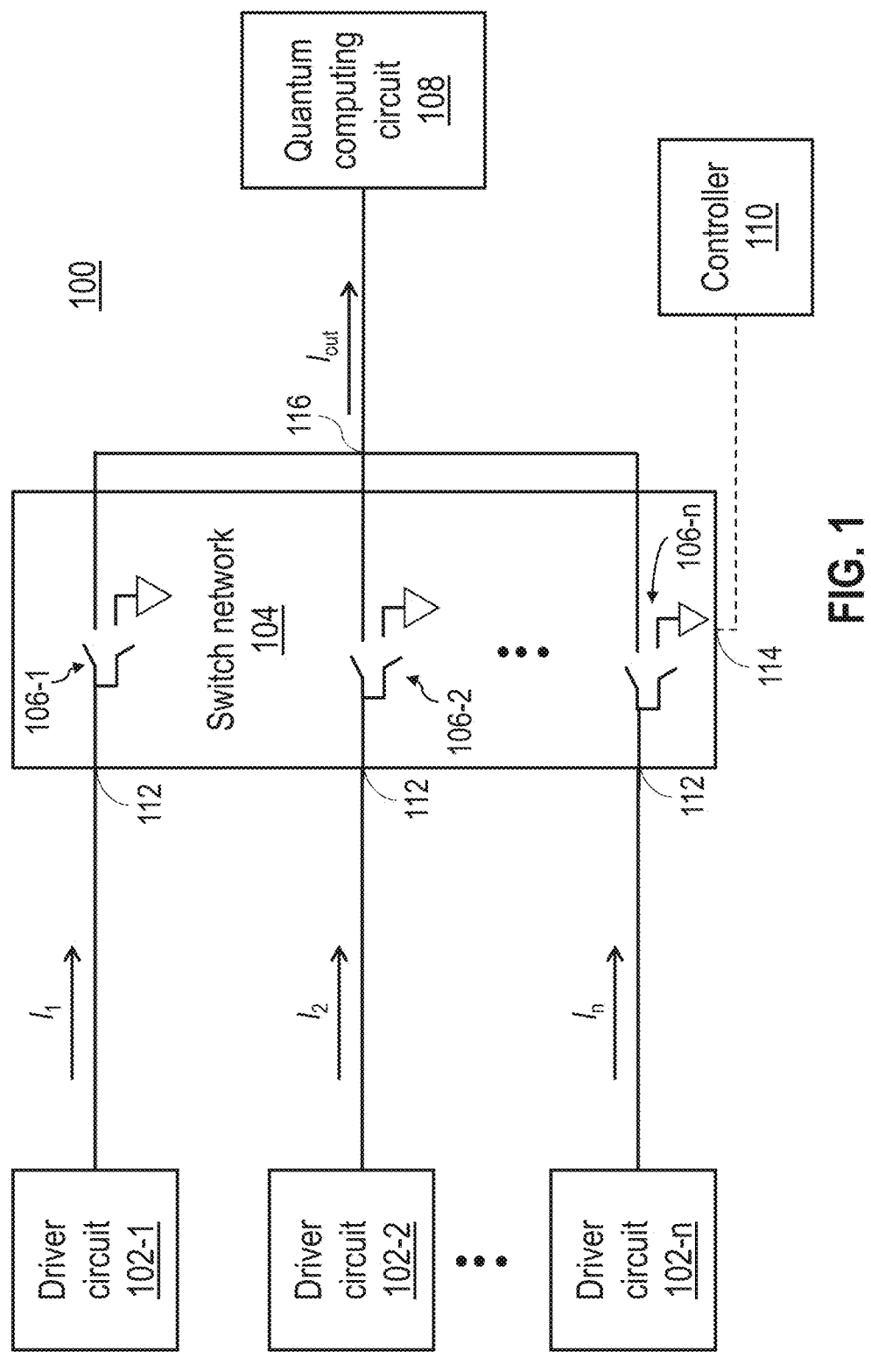
FIG. 1 is a schematic illustrating an example of a circuit device.

This disclosure relates to control circuits for quantum devices, such as qubits and couplers. Operations of these devices (e.g., qubit frequency and coupler bias) can be controlled using control signals that are either provided to the devices directly or are coupled electromagnetically to the devices. For example, a control signal can create a magnetic flux that couples to a qubit, altering the qubit's inductance and thereby the qubit's frequency. Control signals can be applied to couplers to alter the coupling strength between two qubits. Examples of controls signals for quantum circuits include Z control signals and g control signals.

Some approaches to control signal generation may rely on high-magnitude control signals generated at room temperature using general purpose digital-to-analog converters (DACs). Because these signals are relatively large and are generated using well-controlled room-temperature components, the signals' noise components may be made proportionally very small. In addition, the use of the DAC may allow the control signals to be set precisely to any one of many possible values (e.g., $2^{14}$ for a 14-bit DAC), forming arbitrary waveforms. These room-temperature signals are then passed through cold attenuators to a cold quantum system, e.g., in a dilution refrigerator, lowering the signal's noise to near thermally-limited levels (the cryogenic noise floor) through high levels of attenuation, e.g., 20 dB. However, this process results in a high level of power dissipation in the attenuators, which may negatively affect quantum circuit operation (e.g., increase the temperature of quantum components and reduce coherence). Moreover, fast DAC operation (e.g., at GHz speeds) is associated with high power consumption (e.g., from digital signals in the DAC). In addition, these entirely-DAC-based methods output both signal and noise with a wide-band spectrum that may result in high noise.

Some implementations according to the present disclosure include circuit devices that generate control signals using a high-speed switch network that takes, as input, signals from multiple low-power, low-noise driver circuits. By selecting a subset of the signals for inclusion in an output signal, the switch network can provide a desired output signal (used as a quantum circuit control signal) having sufficiently-low noise and controllable between a sufficiently-high number of values. These circuit devices are compatible with cryogenic operation, such that the output signals can be generated directly at low temperatures without, in some cases, resulting from large room-temperature signals that are highly attenuated and cause high power consumption.

In some implementations, circuit designs disclosed herein exhibit features and advantages for effective quantum control. For example, some circuit designs according to the present disclosure generate control signals that, advantageously, are low-noise, high-precision/resolution, and include both static (DC) and dynamic (e.g., 10 ns-1000 ns pulse-width) components. Some circuit designs according to the present disclosure have low power consumption (to reduce heat dissipation that may negatively affect quantum device operation), fast switching speed (e.g., within tens of ns, within several ns (e.g., <5 ns) or within less than one ns), low sensitivity to fluctuations in supply voltage, and low output impedance.

FIG. 1 illustrates an example of a circuit device 100 for providing output signals to a quantum computing circuit 108. The circuit device 100 includes multiple driver circuits 102-1, 102-2, . . . , 102-n, each of which provides a corresponding driver current $I_1, I_2, \ldots, I_n$ (which may be the same or different from one another, and which are referred to generically as driver currents $I_i$) to a switch network 104 through a corresponding switch network input 112. A controller 110, coupled to the switch network 104 through one or more control inputs 114, controls one or more switches 106 of the switch network 104 to provide, at a switch network output 116, an output signal Iout that is a sum of a subset of the driver currents $I_i$, e.g., a single one of the driver currents $I_i$ or a sum of two or more of the driver currents $I_i$, such as all of the driver currents $I_i$.

In the example illustrated in FIG. 1, each driver circuit 102-1, 102-2, . . . , 102-n corresponds to a respective switch 106-1, 102-6, . . . , 106-n in the switch network 104, and the respective switch 106 can be toggled to determine whether the corresponding driver current $I_1, I_2, \ldots, I_n$ is, or is not, included in the output signal Iout. For example, when a switch 106-i is in a first state, the driver current $I_i$ can be included in the output signal $I_{out}$, and, when the switch 106-i is in a second state, the driver current $I_i$ can be diverted to ground or switched to an open circuit/floating, etc.

The output signal $I_{out}$ is provided to a quantum computing circuit 108. For example, the output signal $I_{out}$ can set a resonance frequency of a qubit in the quantum computing circuit 108 to control operations of the qubit, and/or the output signal $I_{out}$ can be provided to a coupler in the quantum computing circuit 108 to set a degree of coupling between two or more qubits.

Some implementations of the present disclosure, such as the circuit device 100, are based on the recognition that, in practice, fast arbitrary waveform generation, such as that provided by a fast, high-power DAC, is not necessary for quantum control operations. Rather, a relatively small number of signal levels may be sufficient. For example, a qubit may be switchable between four different frequencies corresponding to single-qubit-gate operation, two-qubit-gate operation, qubit readout, and qubit reset, each of these frequencies corresponding to a different output signal $I_{out}$ coupling to the qubit. Therefore, the ability to quickly switch between a high number of levels (e.g., $2^{14}$ different values of the output signal $I_{out}$) may not be necessary; rather, fast switching operations may be limited to switching between a single-digit or low-double-digit number of different current levels, e.g., eight different well-defined current levels plus a zero-bias level, for nine total levels. The zero-bias level, in various implementations, can correspond to $I_{out}=0$ (e.g., provide none of the $I_i$ to the switch network output and instead, for example, send all the $I_i$ to ground) and/or $I_{out}=$a constant, DC value, which may be (though need not be) formed by providing a single $I_i$ as $I_{out}$, where the single $I_i$ can be, in some implementations, the lowest driver current among the multiple $I_i$.

Accordingly, some implementations according to this disclosure utilize the fast-switching switch network 104 to form fast $I_{out}$ pulses (e.g., pulses with 10 ns-1000 ns pulse width) based on selectable subsets of the driver currents $I_i$. The driver currents $I_i$ may be, but need not be, adjustable. For example, as described in further detail below with respect to FIGS. 3A-5B, in some implementations the driver circuits 102 may include DACs controllable to adjust the values of the driver currents $I_i$. This adjustment may be useful, e.g., for calibrating the circuit device 100 and/or adapting the circuit device 100 to different quantum computing circuits 108. However, this adjustment may be "slow" (e.g., longer than the pulses of $I_{out}$ used to control quantum devices), such that the adjustment need not be associated with high power consumption by the driver circuits 102. Over the timescales of $I_{out}$ pulses generated by adjustment of switches 106 of the switch network 104, values of the driver currents $I_i$ may be assumed to be constant/DC, e.g., having very low noise/AC components. For its part, the switch network 104 is fast-switching but configured for low power consumption (e.g., based on a relatively small number of possible current levels selectable using the switch network 104). Accordingly, the circuit device 100 as a whole can exhibit the low power consumption useful for reliable quantum circuit operation.

As another way of describing operation of the circuit device 100, high-precision/high-bit current output with low noise (provided by reconfiguring the driver circuits 102) has been separated from high-speed switching (provided by the switch network 104), to facilitate low-noise, low-power, high-speed operation. The driver circuits 102 can be configured to be low-noise and low-power, because they need not (though can, in some implementations) operate with fast (e.g., ns-scale) switching times. Correspondingly, the switch network 104 can be configured to provide fast operation without introducing significant additional noise. Combining all of these functions in a single unit, such as a DAC, may result in higher noise, higher power consumption, and/or lower-speed operation.

In some implementations, the current(s) drawn from current supplying circuits, such as the driver circuit 102, do not change during pulse generation. For example, in some implementations, the switch network 104 draws all driver currents $I_i$ continuously (e.g., over the course of multiple different output currents $I_{out}$, such as before, during, and after a pulse generation), even as different subset(s) of the $I_i$ are selected for inclusion in $I_{out}$. Accordingly, the switch network 104 need not stabilize across varying current inputs, which can reduce noise associated with the switch network 104 and/or reduce power consumption by the switch network 104.

Any or all components of the circuit device 100 can be configured for low-temperature operation, e.g., at cryogenic temperatures compatible with superconductivity. For example, in some implementations, the circuit device 100 can be configured for operation at temperatures of 3K or lower. For example, the one or more portions of the circuit device 100 (e.g., the driver circuits 102) can incorporate resistors that reduce noise at low temperatures but which may not reduce noise if the circuit device 100 were operated at higher temperatures. The quantum computing circuit 108 can be operated at cryogenic temperatures compatible with superconducting qubits of the quantum computing circuit 108, and, accordingly, the other components of the circuit device 100 can be operated at the same or other cryogenic temperature(s).

In addition, some or all components of the circuit device 100 (for example, the driver circuits 102 and the switch network 104) can be provided on-chip, e.g., on a single chip. For example, the driver circuits 102 and the switch network 104 can be integrated circuits on a common substrate, and/or the driver circuits 102 and the switch network 104 can be on separate substrates combined on/mounted on a single chip. The on-chip deriver circuits 102 and switch network 104 can both be operated at cryogenic temperatures while located inside a cryogenic refrigerator, e.g., a dilution refrigerator.

Figure 9:
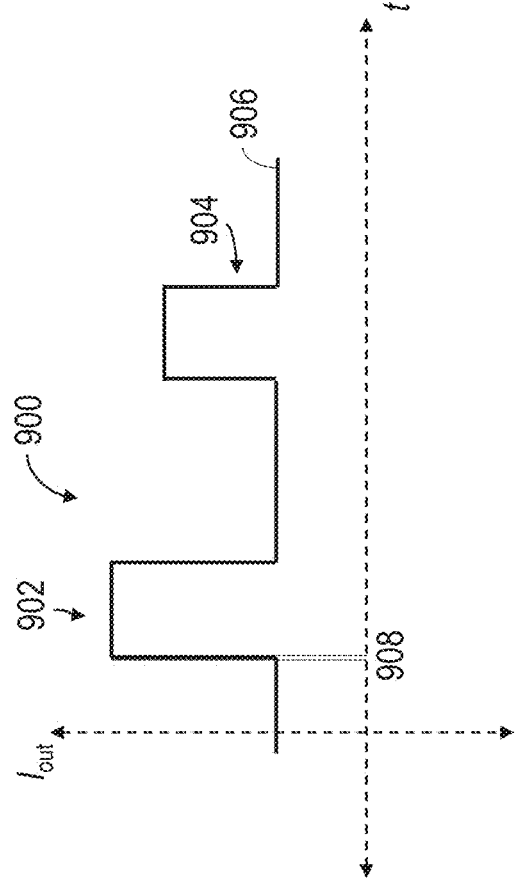
FIG. 9 is a diagram illustrating an example of an output signal.

FIG. 9 illustrates an example of an output signal $I_{out}$ waveform 900 that may be generated by control of the switch network 104. The waveform 900 includes pulses 902, 904 and a DC component 906. Current values of the waveform 900 can vary in various implementations. In some implementations, the DC component 906 is between 0 μA and 1 mA, such as between 50 μA and 800 μA, and peak values of the pulses 902, 904 differ from the DC component 906 by between 100 nA and 500 μA. A switching time 908 of the pulses 902, 904 can be, for example, less than 10 ns, less than 5 ns, or less than 2 ns. In some implementations, based on the circuit devices described herein, noise in $I_{out}$ is less than $1 \cdot 10^{-5}$ times a total value of $I_{out}$, e.g., over a 300 MHz bandwidth. For example, for $I_{out}=1$ mA, the noise component can be less than 30 nA. In some implementations, $I_{out}$ is bipolar, e.g., can vary between −1 mA and 1 mA.

Respective different levels of the pulses 902, 904 correspond to different combinations of driver current(s) $I_i$ that are summed to form $I_{out}$, and also correspond to different operations/states of quantum devices that receive the pulses 902, 904. Accordingly, the $I_i$ can be configured so that, when summed in various combinations, desired values of $I_{out}$ can be obtained.

In an example of a circuit device, the quantum computing circuit 108 includes qubits that receive the output signal $I_{out}$ to set the qubits' frequencies for different modes of qubit operation. A qubit can receive, for example, a 20 μA pulse to be set to a frequency for single-qubit gate operation; a 25 μA pulse to be set to a frequency for two-qubit gate operation; a 35 μA pulse to be set to a frequency for qubit readout; or a 500 μA pulse to be set to a frequency for qubit reset. Accordingly, in order to provide each of the foregoing current values, the driver circuits 102 can be configured so that, for example, $I_1=20$ μA, $I_2=5$ μA, $I_3=10$ μA, and $I_4=500$ μA. To set a qubit to single-qubit gate operation, the switches 106 are adjusted (e.g., by the controller 110) so that $I_{out}=I_1$. To set a qubit to two-qubit gate operation, the switches 106 are adjusted so that $I_{out}=I_1+I_2$. To set a qubit for readout, the switches 106 are adjusted so that $I_{out}=I_1+I_2+I_3$. To set a qubit for reset, the switches 106 are adjusted so that $I_{out}=I_4$. Note that this is a non-limiting example, and many other configurations are within the scope of this disclosure. For example, the driver circuits 102 may be configured so that $I_1=20$ μA, $I_2=25$ μA, $I_3=35$ μA, and $I_4=500$ μA, and the switches 106 can then be controlled so that a single $I_i$ is provided as $I_{out}$ to control qubit operations. In some implementations, the driver circuits 102 include a driver circuit configured to provide the DC component 906; the driver current from this driver circuit may be continuously included in $I_{out}$, with other driver current(s) added transiently to form pulses.

Figure 2A:
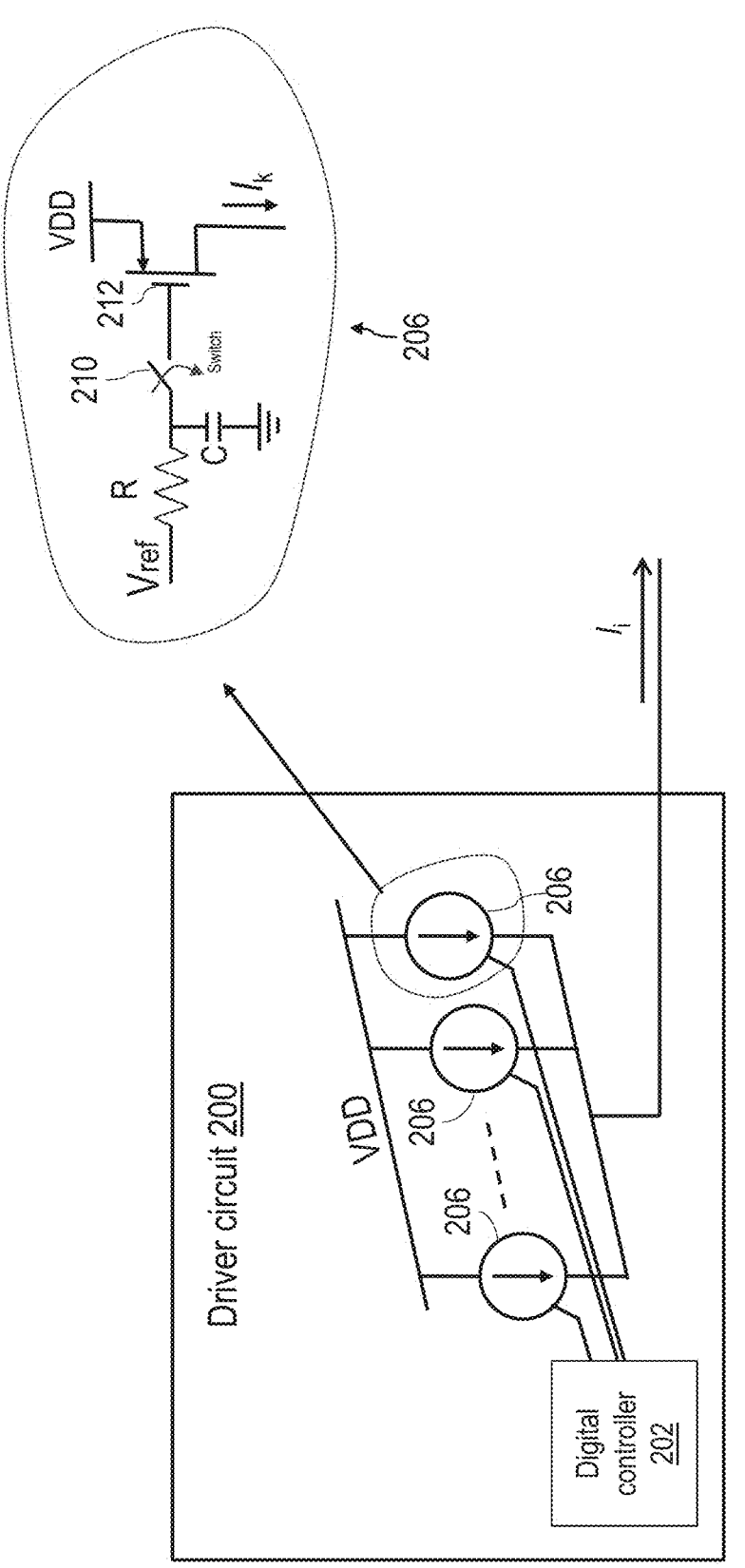
FIGS. 2A-2B are schematics illustrating examples of driver circuits.
Figure 2B:
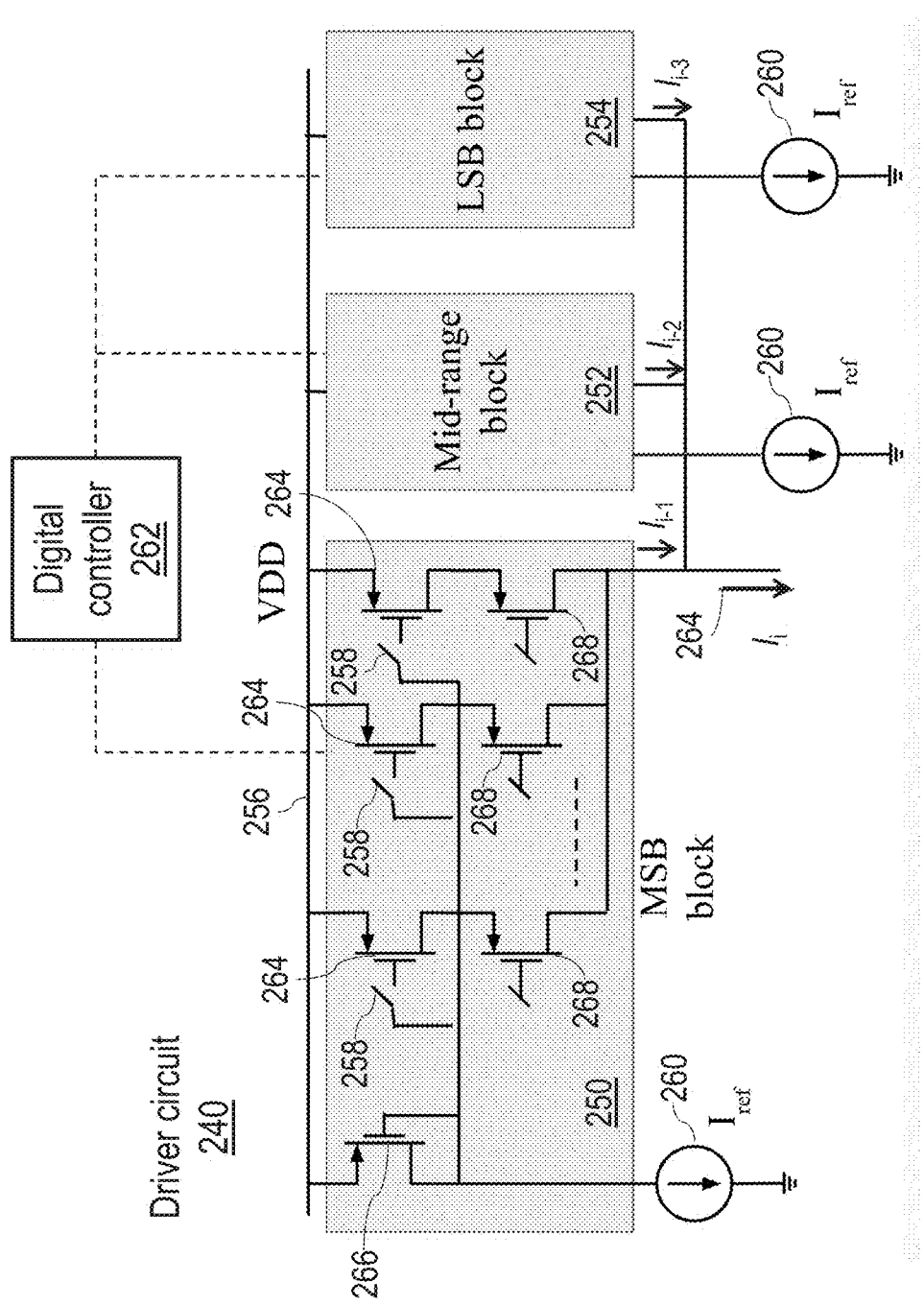

FIGS. 2A-2B illustrate examples of driver circuits, which may be used as any one or more of the driver circuits 102 illustrated in FIG. 1. As shown in FIG. 2A, a driver circuit 200 includes multiple controllable current sources 206 arranged in parallel to one another between a supply voltage VDD and a driver current output at which the driver current $I_i$ (a summation of the currents $I_k$ from each current source 206) is output, e.g., to the switch network 104. A digital controller 202 (e.g., a DAC) is coupled to each of the current sources 206 to control whether each current source 206 contributes to the driver current $I_i$. The digital controller 202 need not be fast-switching and, accordingly, may be configured for low power consumption.

As shown in the inset drawing of FIG. 2A, each current source 206 includes a reference voltage input for receiving a reference voltage, a series resistance R, and a capacitance C to ground, acting as a low-pass filter for gating of the transistor 212 to reduce noise in the current $I_k$ and, accordingly, the driver current $I_i$. Each current source 206 further includes a transistor 212 (here, a PMOS transistor) having a first source or drain node coupled to the supply voltage VDD, a second source or drain node at which is output a current $I_k$ to be summed with currents from the other current sources 206 to generate the driver current $I_i$, and a gate node coupled to a switch 210. The switch 210 is controlled by the digital controller 202 to set whether the current source 206 does (switch is closed) or does not (switch is open) contribute to the driver current $I_i$. Therefore, based on control by the digital controller 202, the driver circuit 200 is switchable between a number of driver currents $I_i$ that scales with the number of current sources 206. For a high number of current sources 206, the driver current $I_i$ can correspondingly be set with a high level of precision. In some implementations, filters included in the driver circuits described herein, such as the low-pass filter of FIG. 2A, can reduce a speed with which the currents of the driver circuit can be switched. However, the subsequent switch network (e.g., switch network 104) provides effective current control.

FIG. 2B illustrates another example of a driver circuit 240, e.g., which may be understood as a more detailed schematic of some implementations of the driver circuit 200 of FIG. 2A. The driver circuit 240 includes three blocks: a most significant bit (MSB) block 250, a mid-range block 252, and a least significant bit (LSB) block 254. The blocks 250, 252, 254 can have the same or similar circuit architecture (e.g., identical or differing in number of switches/transistors), with, in some implementations, the sizes of the transistors in each block 250, 252, 254 being different from one another such that different current levels can be provided by each block. Each block 250, 252, 254 is coupled to a corresponding reference current 260.

By way of example, the internal architecture of the MSB block 250 is illustrated. The MSB block 250 includes transistors 264 controlled by corresponding switches 258. Transistor 266 provides a reference voltage for the transistors 264, and further transistors 268 are coupled in a cascode configuration to shield the transistors 264. For example, the voltages on the gates of the transistors 268 may be provided by an amplifier loop based on sensing the drain of the transistors 264. The transistors 264 in conjunction with the switches 258 act as current sources controllable by a digital controller 262, e.g., a DAC or a distinct controller. Based on the states of the switches 258 within each block 250, 252, 254, a controllable block current $I_{i-1}$, $I_{i-2}$, $I_{i-3}$ is obtained. The digital controller 262 can provide signals to the switches 258 of each block 250, 252, 254 in accordance with DAC operation to set the controllable block currents to obtain a desired driver current $I_i$. For example, the digital controller 262 can obtain a binary code representing the driver current $I_i$ and control the blocks 250, 252, 254 (e.g., based on binary-weighted sizes of the transistors 264 of the blocks 250, 252, 254, corresponding to binary-weighted currents from each current source/block 250, 252, 254) to produce the driver current $I_i$.

Figure 3A:
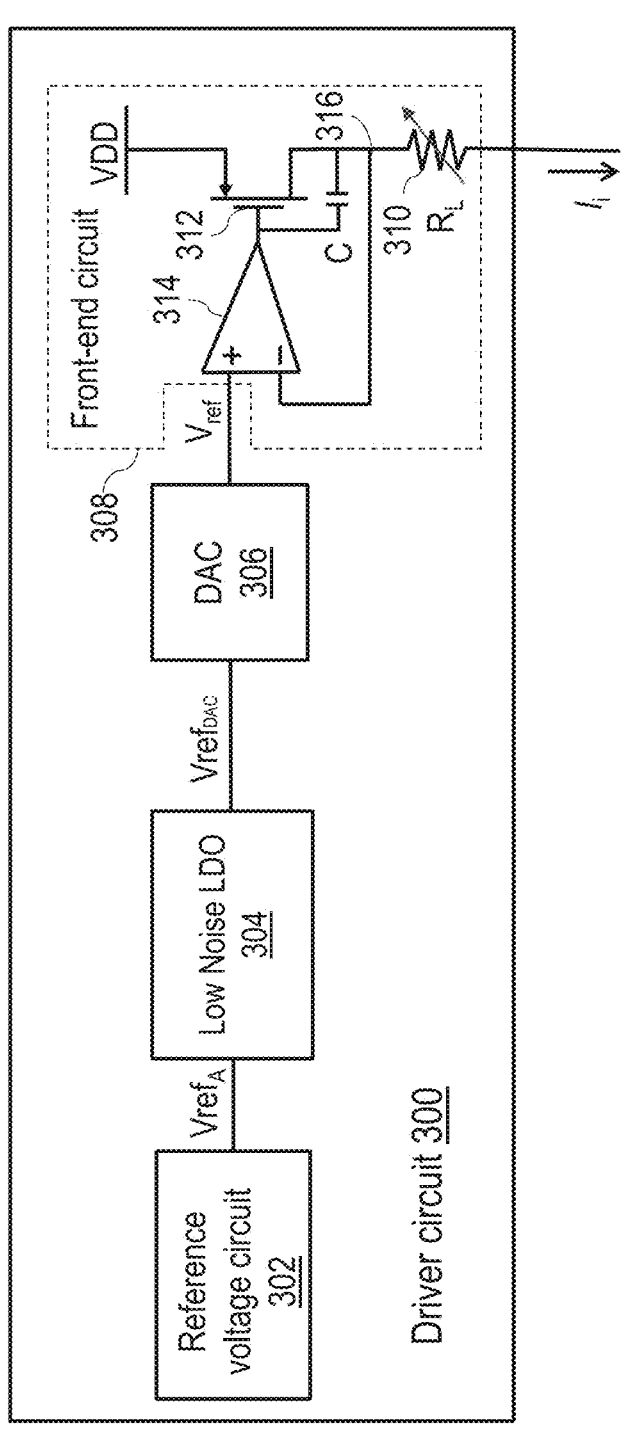
FIG. 3A is a schematic illustrating an example of a driver circuit.

FIG. 3A illustrates another example of a driver circuit 300 that can be included as one or more of the driver circuits 102 illustrated in FIG. 1. The driver circuit 300 generally includes several circuit blocks 302, 304, 306, 308, which can be separately provided and/or combined with one another, in various implementations.

A reference voltage circuit 302 is configured to output a stable, low-noise reference voltage $V_{ref,A}$ for use in subsequent circuit processing. The reference voltage $V_{ref,A}$ is provided to a low-noise low-dropout regulator (LDO) circuit 304 that generates a second reference voltage $V_{ref,DAC}$ to serve as a reference voltage for a DAC 306. The DAC 306, based on $V_{ref,DAC}$ and based on one or more DAC control inputs (not shown), provides a voltage Vref to a front-end circuit 308. Vref can be adjustable by the DAC 306 to adjust the resulting driver current $I_i$. Moreover, in some implementations, the DAC 306 is a current-based DAC that provides a stable, low-noise reference current $I_{ref}$ to a front-end circuit, e.g., instead of or in addition to providing a reference voltage $V_{ref}$ with the configuration shown in FIG. 3A. In some implementations, instead of or in addition to providing the reference voltage and/or current $V_{ref}$ and/or $I_{ref}$, the DAC 306, or a controller distinct from the DAC 306, provides control signal(s) that adjust states of switch(es) of the front-end circuit 308, e.g., to adjust the driver current $I_i$. In addition, in some implementations, the reference voltage and/or reference current $V_{ref}$ and/or $I_{ref}$ is provided by a source that is not the DAC 306, e.g., by the reference voltage circuit 302 directly and/or by the low-noise LDO 304 directly. Accordingly, given the wide range of circuit configurations within the scope of this disclosure, the driver circuit 300 can be represented as generally illustrating a set of circuit blocks 302, 304, 306, 308 that together generate a driver current $I_i$, rather than limiting the scope of driver circuits to a particular topology/arrangement.

The front-end circuit 308, in this example, includes an operational amplifier (op-amp) 314 connected in a buffer configuration with a transistor 312, a capacitor C, and a load resistor ($R_L$) 310, which can be (though need not be) adjustable. For example, the load resistor 310, and other load resistors $R_L$ described in reference to FIGS. 3A-3I, can include a controllable resistor network, e.g., as described in reference to FIG. 3K. While the values of $R_L$ can vary depending on the implementation, in some implementation RL is between 0.5 k$\Omega$ and 10 k$\Omega$. The front-end circuit 308 illustrated here is a non-limiting example; further examples of the front-end circuit are described below.

An objective of some implementations is to obtain a well-controlled, low-noise, low-impedance voltage at node 316 for setting the driver current $I_i$, along with stable reference voltages throughout the driver circuit 300, because the stability of the driver current $I_i$ is linked to the stability of reference voltages/currents provided to various components of the driver circuit 300. For example, a low-noise driver current $I_i$ is based on a low-noise $V_{ref}/I_{ref}$ which is based on a low-noise, $V_{ref,DAC}$, which is based on a low-noise $V_{ref,A}$. This stability may be particularly important at cryogenic temperatures, where resistance associated with wiring may be relatively high (e.g., tens of Ohms).

As noted above, although illustrated here as a single voltage $V_{ref}$ provided to the front-end circuit, in some implementations multiple signals are provided to the front-end circuit, which can include one or more reference voltages (e.g., $V_{ref}$), one or more reference currents (e.g., $I_{ref}$) and/or one or more control signals (e.g., control signal(s) from the DAC 306 or a controller distinct from the DAC 306 to adjust switches of the front-end circuit 308). For example, a reference voltage can be provided to the front-end circuit 308 to obtain stable, low-noise current generation, and the DAC 306 or the controller distinct from the DAC 306 can separately control switches of the front-end circuit 308 to set $I_i$. In this example, the DAC 306 controls the driver current $I_i$ by adjusting $V_{ref}$.

Portions of the driver circuit 300, such as the reference voltage circuit 302, the DAC 306, and/or the front-end circuit 308, can be configured for low-noise operation. For example, the reference voltage circuit 302 can be configured as described in reference to FIG. 6, the DAC 306 can be configured as described in reference to FIGS. 5A-5B, the front-end circuit 308 can be configured as described in reference to FIGS. 3B-3J, and/or operational amplifier(s), such as any of the operational amplifiers described as included in a front-end circuit (e.g., operational amplifier 314) can be configured as described in reference to FIGS. 4A-4B.

For example, any one or more of these circuits can be configured so that low-temperature noise is dominated by resistor noise. Channel noise (associated with current through a transistor channel) can be taken as approximately temperature-independent for a given current density, e.g., may be higher-than-desired at cryogenic temperatures. By contrast, resistor noise is thermal noise that decreases with decreasing temperature, such that low-temperature resistor noise can be very low, e.g., current noise $I_n$ of tens of nA, or less, in a driver current $I_i$ passing through a load resistor. Accordingly, circuits described herein can be configured with resistor-dominated design to decrease noise.

Figure 3D:
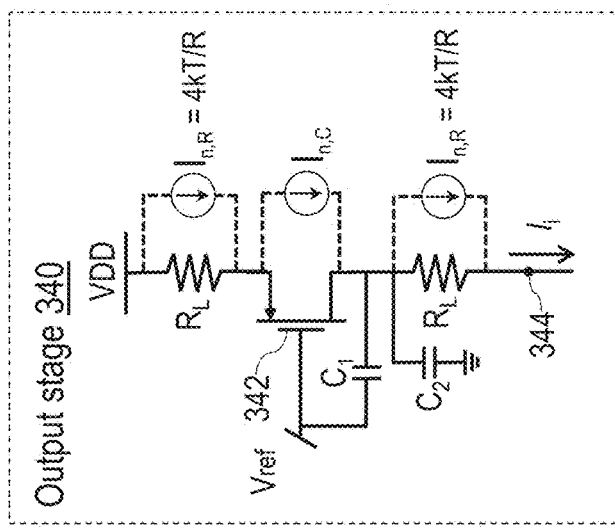
FIGS. 3B-3D are schematics illustrating examples of output stages.
Figure 3C:
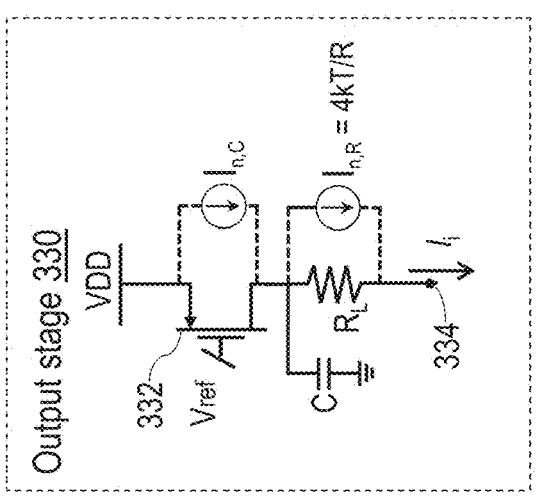
Figure 3B:
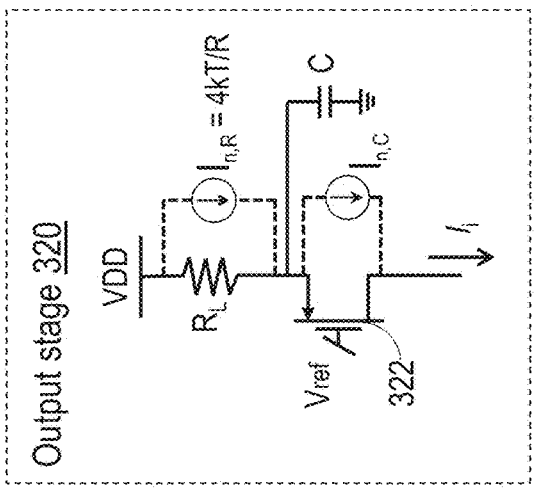

For example, FIG. 3B illustrates an example of an output stage 320 configured for low-noise operation. One or more output stages 320 can be included as and/or in the front-end circuit of the driver circuit 300 illustrated in FIG. 3A The output stage 320 includes a transistor 322, a resistor $R_L$ coupled in series between a first source or drain node of the transistor 322 and a supply voltage VDD, and a capacitor C to ground. The transistor 322 is controlled by the reference voltage $V_{ref}$ at a gate node of the transistor 322, and, based on the value of the reference voltage $V_{ref}$ (which in some implementations is adjustable by the DAC 306), a driver current $I_i$ is provided from a second source or drain node of the transistor 322. In some cases, the capacitor C of the output stage 320 is a parasitic capacitance rather than a discrete circuit component; the connection to ground through the capacitor C, and the capacitor C itself, may not be included in some implementations.

Each of the transistor 322 and the resistor $R_L$ are associated with respective noise functions $I_{n,c}$ and $I_{n,R}$, where $I_{n,R}=4kT/R$ to decrease with decreasing temperature as described above (k being Boltzmann's constant, T being temperature, and R being the resistor value). $I_{n,c}$ and $I_{n,R}$ are illustrated conceptually as noise current sources in FIG. 3B. $I_{n,C}$ has a less favorable relationship with temperature, e.g., is constant with decreasing temperature or increasing with decreasing temperature. However, the arrangement of the transistor 322 and the resistor $R_L$ in the output stage 320 results in transistor noise $I_{n,C}$ being shielded from the driver current $I_i$ for low frequencies (e.g., frequencies less than 100 kHz), such that the driver current $I_i$ is dominated by the resistor noise $I_{n,R}$, which can be very low at cryogenic temperatures. Accordingly, low-frequency noise is suppressed in the driver current $I_i$ generated by the output stage 320.

FIG. 3C illustrates another example of an output stage 330, one or more of which can be included in and/or as the driver circuit 300. The front end circuit 330 shields noise from a transistor 332 using a resistor $R_L$ coupled to a source or drain node of the transistor 332, as described for the output stage 320. In this case, the resistor $R_L$ is coupled in series between the source or drain node and an output node 334 from which the driver current $I_i$ is provided. Based on the architecture of the output stage 330, high-frequency noise (e.g., noise at frequencies above 10 MHz) is suppressed in the driver current $I_i$. The capacitor C of the output stage 330 can be a parasitic capacitance and/or an intentionally-fabricated capacitance, and may promote noise suppression in the output stage 330. As described for FIG. 3B, $I_i$ can be adjusted by the DAC 306 by adjustment of $V_{ref}$ FIG. 3D illustrates an example of an output stage 340 in which the topologies of the output stages 320 and 330 are combined. Here, resistors $R_L$ (which need not have the same resistance value) are provided both in series between a first source or drain node of the transistor 342 and the supply voltage VDD, and in series between a second source or drain node of the transistor 342 and an output node 344 from which the driver current $I_i$ is provided. A capacitor $C_1$ (which may be a parasitic capacitance and/or an intentionally-fabricated capacitance, e.g., a capacitor device) shorts the gate and the second source or drain node of the transistor 342, turning the transistor into an equivalent resistance that reduces noise leakage to the driver current $I_i$, because most noise circulates in the transistor 342 instead of being output in the driver current $I_i$. This arrangement results in shielding of the transistor noise $I_{n,c}$ over a wide range of frequencies, for wide-band noise suppression in the driver current $I_i$. As described for FIG. 3B, $I_i$ can be adjusted by the DAC 306 by adjustment of $V_{ref}$ Variations of the output stages 320, 330, 340 are also within the scope of this disclosure. For example, some implementations can include additional circuit element(s) and/or not include one or more of the illustrated circuit element(s). For example, some implementations of the output stage 340 may not include the capacitor $C_2$ between the second source or drain node of the transistor 342 and ground, without departing from the scope of this disclosure.

Any of the output stages 320, 330, 340, or variations thereof, can be integrated into the architecture of the driver circuit 300, e.g., included in the front-end circuit of the driver circuit 300. FIG. 3E illustrates an example of a front-end circuit 351 (including an output stage 350 having characteristics as described for the output stage 340, with one fewer capacitor) coupled to the DAC 306 as illustrated in FIG. 3A. For example, the front-end circuit 351 can replace the example of the front-end circuit 308 of FIG. 3A. Here, the DAC 306 is a current DAC that generates a low-noise reference current $I_{ref}$ The front-end circuit 351 has a generally feed-forward configuration. The output stage 350 is connected in a current mirror arrangement with other circuit elements, including a transistor 354 and a resistor R, which provide a reference voltage $V_{ref}$ at node 353 through a low-pass filter (LPF) 356. The reference current $I_{ref}$ is set through the transistor 354. The transistor 354 and the resistor R are provided in a resistor-dominated arrangement as described in reference to FIGS. 3B-3D, to allow a stable, low-noise signal to be provided to a gate node of the transistor 354.

The gate node of the transistor 352 is coupled to a gate of transistor 354 through a low-pass filter 356. In some implementations, optionally, a switch 358 is configured to enable/disable flow of the driver current $I_i$ based on control by the DAC 306 (e.g., a controller in the DAC 306, or a controller distinct from the DAC 306). When multiple output stages are included in the front-end circuit, such as multiple parallel iterations of the output stage 350 as described in reference to FIG. 3J, the total $I_i$ can be controlled by the DAC 306 or a controller distinct from the DAC 306 by selectively enabling/disabling a subset of the circuit stages by opening/closing switches 358 of the circuit stages. $I_n$ some implementations, a switch 357 (which can be controlled by the same controller that controls the switch 358) controllably couples the gate of transistor 352 to the supply voltage VDD; the switch 357 can be used to disable the transistor 352 when the output stage 350 is not being used to output $I_i$. For example, the switches 357, 358 can be controlled complementarily so that, when one is closed, the other is open, and vice-versa.

The low-pass filter 356, the resistor-dominated design of the output stage 350 (with resistors $R_L$ arranged in series between source and drain nodes of the transistor 352 and the voltage source VDD and the output for the driver current $I_i$), and/or the resistor-dominated design of the transistor 354 and the resistor R, can provide low-noise current output of the driver current $I_i$, such that quantum devices controlled based on the driver current $I_i$ can be controlled precisely and reliably.

Figure 3F:
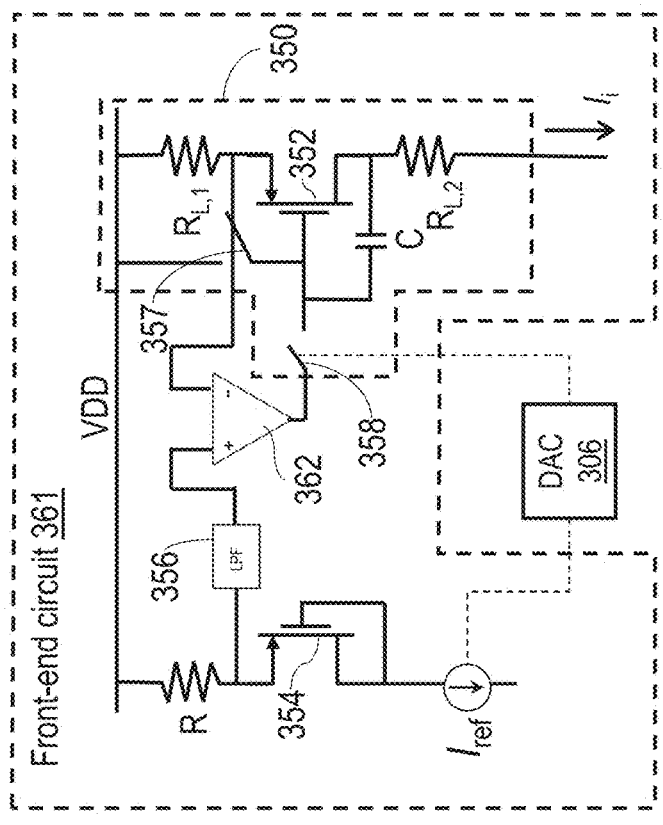
FIGS. 3E-3J are schematics illustrating examples of front-end circuits.
Figure 3E:
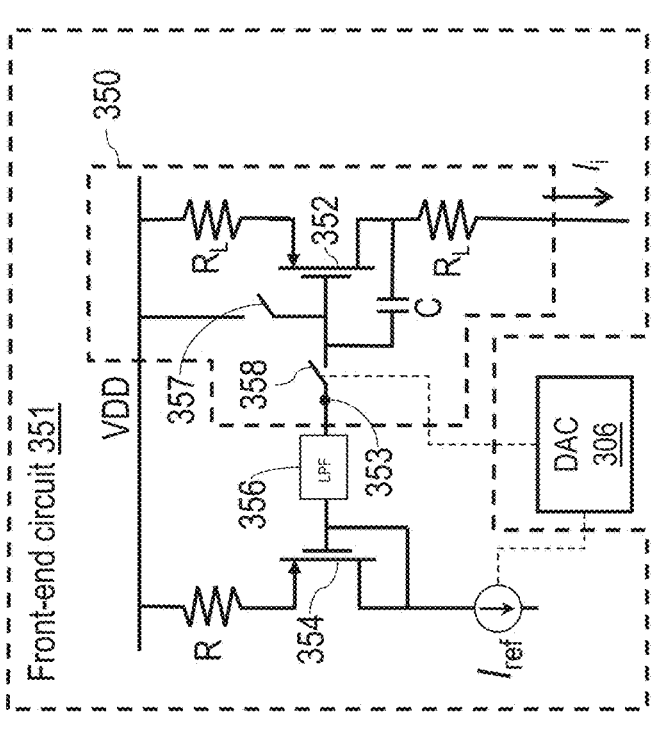

FIG. 3F illustrates another example of a front-end circuit 361 including the output stage 350, the front-end circuit 361 having characteristics as described for front-end circuit 351 except where indicated otherwise. In the front-end circuit 361, an operational amplifier 362 regulates currents through resistors R and $R_{L,1}$ to be equal to one another, such that a voltage corresponding to the low-noise reference current $I_{ref}$ (e.g., provided by the DAC 306) is transferred to the output stage 350 and used as a basis for the driver current $I_i$. As described in reference to FIG. 3E, a DAC 306, and/or a distinct controller, can control the driver current $I_i$ by adjusting either or both of the reference current $I_{ref}$ or optional switches 358 of multiple parallel output stages 350. As described for FIG. 3E, the resistor-dominated design of the front-end circuit 361, in combination with regulation by the operational amplifier 362, results in low noise in the driver current $I_i$.

Figure 3H:
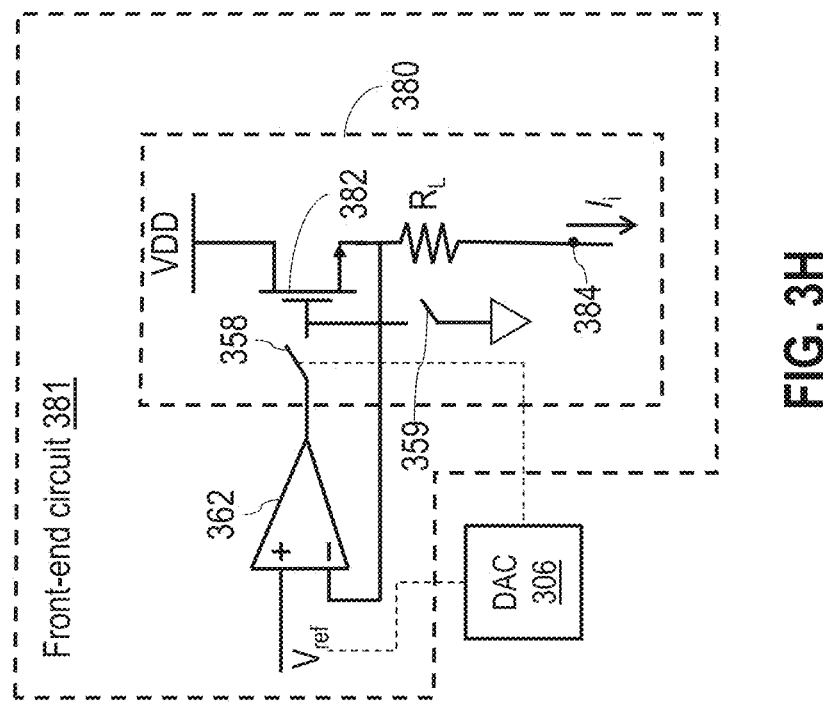
Figure 3G:
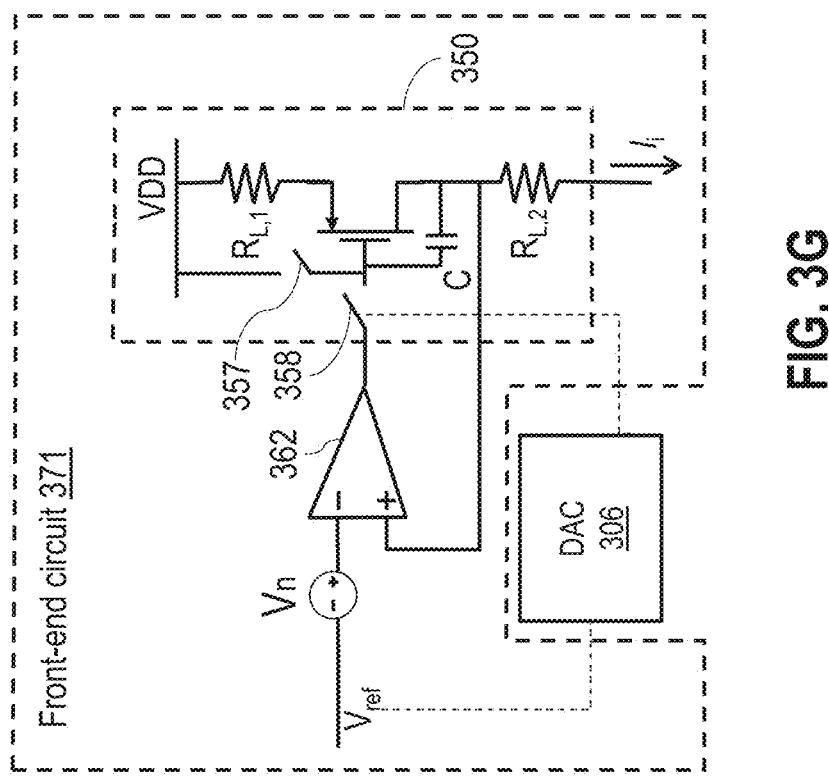

FIG. 3G illustrates another example of a front-end circuit 371, this circuit utilizing a feedback architecture to reduce low-frequency noise in the driver current $I_i$. A noise component $V_n$ (illustrated conceptually), generated by an operational amplifier 362, is passed to the driver current $I_i$, such that a low-noise design for the operational amplifier 362 can reduce the noise. The DAC 306 and/or a controller distinct from the DAC can adjust $V_{ref}$ and/or control optional switches 358 of multiple parallel output stages 350, to adjust the driver current $I_i$. Some implementations of the front-end circuit 371 can omit resistor $R_{L,1}$ based on the low-frequency noise suppression of the operational amplifier 362's feedback configuration. As described for FIG. 3E, the resistor-dominated design of the front-end circuit 371, in combination with noise reduction by the operational amplifier 362, results in low noise in the driver current $I_i$.

FIG. 3H illustrates another example of a front-end circuit 381. The front-end circuit 381 includes an output stage 380 that includes an NMOS transistor 382 and a resistor $R_L$ coupled in series between the NMOS transistor 382 and an output node 384 from which a driver current $I_i$ is provided, to suppress transistor-originating noise in the driver current $I_i$ as described above. The NMOS transistor 382 provides a low impedance at the output node 384 (e.g., in some cases without a capacitor C as in the output stage 350), a beneficial characteristic at low temperatures where the impedance associated with wiring can be relatively high. The DAC 306 and/or a controller distinct from the DAC can adjust $V_{ref}$ and/or control switches 358 of multiple parallel output stages 380, to adjust the driver current $I_i$. In some implementations, a switch 359 (which can be controlled by the same controller that controls the switch 358) controllably couples the gate of transistor 382 to ground; the switch 359 can be used to disable the transistor 382 when the output stage 380 is not being used to output $I_i$. For example, the switches 359, 358 can be controlled complementarily so that, when one is closed, the other is open, and vice-versa.

Figure 3J:
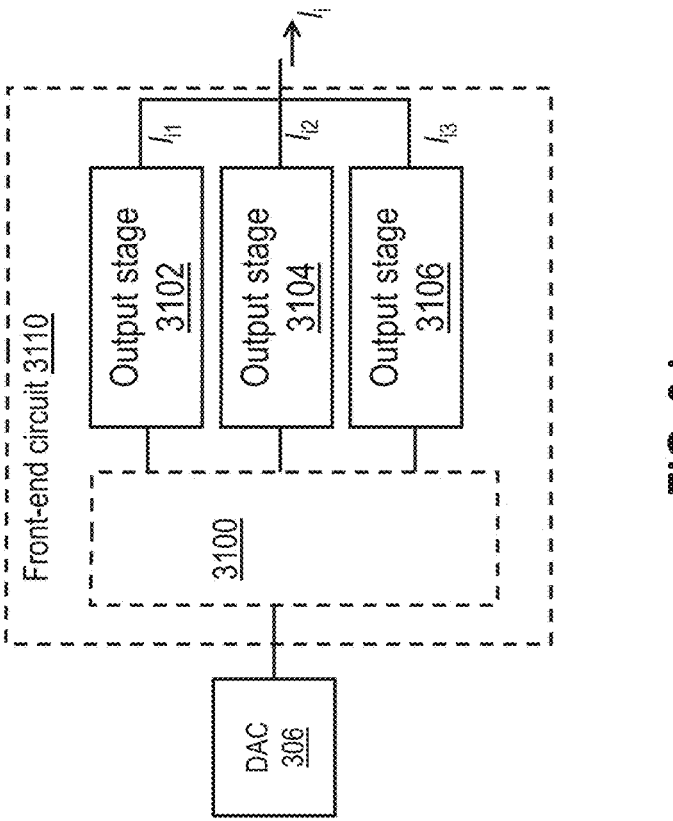
Figure 3I:
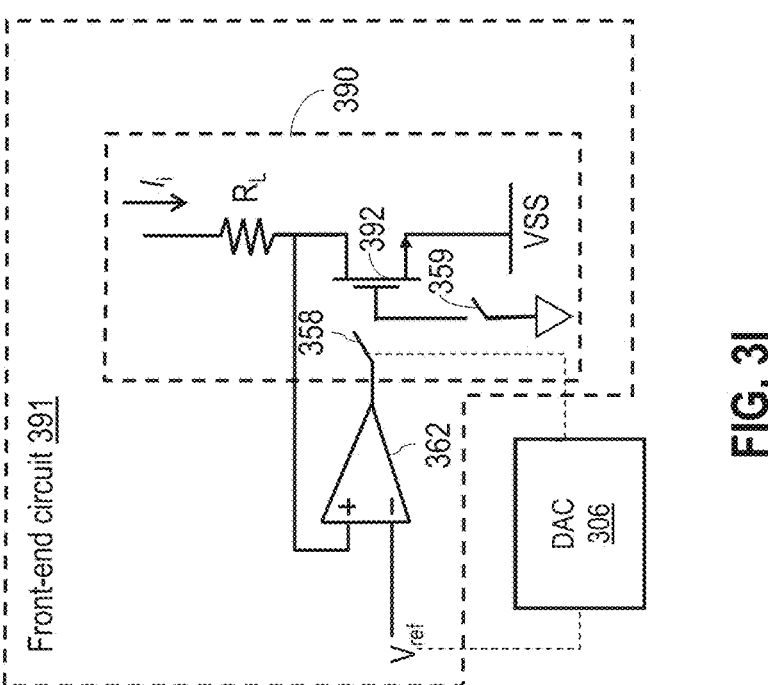

FIG. 3I illustrates another example of a front-end circuit 391. The front-end circuit 391 includes an output stage 390 having a common-drain configuration with a PMOS transistor 392. To reduce noise in the generated driver current $I_i$, the output stage 390 includes a resistor $R_L$ in series between a source or drain node of the PMOS transistor 392 (in this example, the source node) and the output of the generated driver current $I_i$. As described in the foregoing examples, the DAC 306 can control the driver current $I_i$ by adjusting $V_{ref}$ and/or a controller in the DAC 306 or distinct from the DAC 306 can control optional switches of multiple parallel output stages 390 to control the driver current $I_i$. The output stage 390 is a current-sinking circuit and, as such, in some implementations is included in a front-end circuit of a driver circuit in parallel with one or more current-sourcing circuits, e.g., any one or more of the output stages 320, 330, 340, 350, 360, 370, and/or 380. In such configurations, the output stage 390 can share the load resistor $R_L$ (which, as noted above, may be a resistor network) and/or other circuit components, such the operational amplifier 362, with the current-sourcing output stage(s). In some implementations, the output stage 390 includes switch 359 as described in reference to FIG. 3H.

FIG. 3J illustrates an example of a front-end circuit 3110 including multiple output stages, e.g., two, three, or more output stages. Here, three output stages 3102, 3104, 3106 are included, each of which can be any of the output stages described herein, e.g., output stages, 320, 330, 340, 350, 360, 380, and/or 390. A DAC 306 provides input to the output stages 3102, 3104, 3106 through one or more optional intermediate circuits 3100, which can include, for example, operational amplifier(s) connected to the DAC 306 and the output stages 3102, 3104, 3106 as illustrated in FIGS. 3A and/or 3F-3I, and/or current mirror component(s) based on $I_{ref}$ as illustrated in FIGS. 3E-3F. In some implementations, one or more of the output stages 3102, 3104, 3106 include switches (e.g., switches 358 as illustrated in FIGS. 3E-3I) that the DAC 306 (e.g., a digital controller in the DAC 306), or a controller distinct from the DAC 306, is configured to selectively open/close to select zero, one, multiple, or all of the output stages 3102, 3104, 3106 that provide respective currents $I_{i1}, I_{i2}, I_{i3}$ that sum to form $I_i$, the driver current of the driver circuit including the front-end circuit 3110 of FIG. 3J. Accordingly, the DAC 306, or the controller distinct from the DAC, can controllably set the value of $I_i$. In some implementations, instead or additionally, the DAC 306 provides an adjustable analog voltage or current input (e.g., $I_{ref}$ or $V_{ref}$) that can be used to set $I_{i1}, I_{i2}, I_{i3}$ and, accordingly, $I_i$. In some implementations, $I_{i1}, I_{i2}, I_{i3}$ are different from one another. For example, transistors of the output stages 3102, 3104, 3106 through which $I_{i1}, I_{i2}, I_{i3}$ are provided (e.g., transistors 312, 322, 332, 342, 352, 382, and/or 392) can have different sizes, and/or load resistors $R_L$ of the output stages 3102, 3104, 3106 can have different values, such that the DAC 306 and/or the controller distinct from the DAC sets the value of $I_i$ based on a weighted scheme, e.g., binary-weighted currents from the output stages 3102, 3104, 3106.

In some implementations, one or more load resistors $R_L$, of any of the front-end circuits described with respect to FIGS. 3A-3J, can be adjustable, e.g., can be a resistor network. This can be based on an optimization related to $I_i$ and noise. In some implementations, the maximum value of $I_i$, $I_{i,max}$, is limited by the value of $R_L$, e.g., $I_{i,max} \approx (\text{VDD} - 0.2)/R_L$ for the front-end circuit 308. This suggests a low value of $R_L$ to permit high current values. However, in some implementations, noise in $I_i$ can scale approximately inversely with $R_L$, suggesting a high value of $R_L$ to reduce noise in i to improve quantum circuit control. Accordingly, in some implementations, $R_L$ is adjustable so that $R_L$ can be made only as small as $R_L$ "needs to be" to facilitate the target driver current $I_i$. For example, $R_L$ can be controlled using switches controlled by the controller 110 or another controller circuit. For example, $R_L$ can be controlled such that higher values of $I_i$ correspond to lower values of $R_L$ and such that lower values of $I_i$ correspond to higher values of $R_L$, to reduce noise. I$_n$ some implementations, the controller that controls R$_L$ is the same controller that may control switches of the front-end circuit to adjust I$_i$.

Figure 3K:
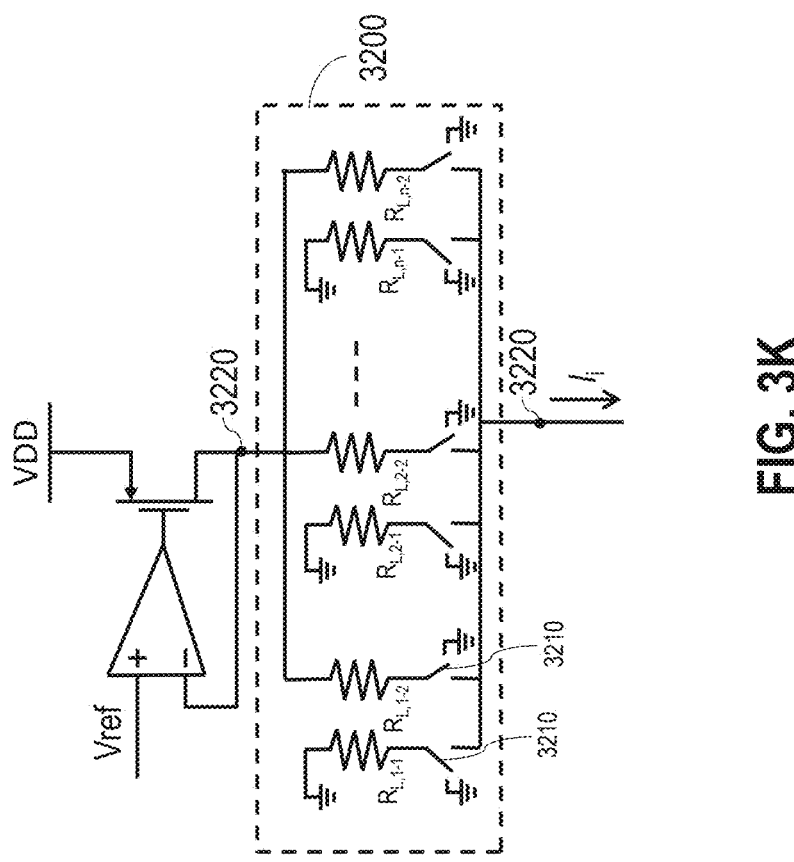
FIG. 3K is a schematic illustrating an example of a resistor network.

FIG. 3K illustrates an example of an R$_L$ resistor network 3200 in the context of an output stage of a front-end circuit of a driver circuit. The resistor network 3200 includes multiple pairs of matched resistors R$_{L,1-1}$/R$_{L,1-2}$, R$_{L,2-1}$/R$_{L,2-2}$, . . . , R$_{L,n-1}$/R$_{L,n-2}$, where n can be any integer. The R$_{L,i-1}$ are dummy resistors, while the load resistors R$_{L,i-2}$ carry current from a supply voltage VDD. Switches (e.g., switches 3210) can be always open, always closed, or controlled to switched between ground and the output in accordance with (e.g., to change) the driver current I$_i$. As described above, larger R$_L$ is used for smaller target I$_i$ to reduce noise in I$_i$. The switches can be controlled in synchronicity such that, when a load resistor is open, its corresponding dummy resistor is closed, and vice-versa, to maintain constant loads at the input node 3220 and the output node 3230.

The optional control of each I$_i$ described with respect to FIGS. 3A-3K is distinct from the control of I$_{out}$ obtained using the switch network 104 in conjunction with multiple I$_i$. For example, adjustment of I$_i$ (e.g., using DACs 306) can be (though need not be) a slow process, e.g., with switching times greater than 10 ns. For example, in some implementations, the I$_i$ are adjusted as part of a calibration process performed periodically and/or upon startup of a quantum system that includes the circuit device 100. The calibration can be based on, for example, current conditions (e.g., precise temperature), particular characteristic(s) of the quantum computing circuit 108, planned operations to perform using the quantum computing circuit 108, etc. In some implementations, at least two of the driver circuits 102 including a respective DAC (e.g., a first DAC for driver circuit 102-1 and a second DAC for driver circuit 102-2), and the DACs can be used/controlled separately to set the I$_i$. Once calibrated, the I$_i$ are constant and used to generated fast pulses in I$_{out}$ for quantum control, e.g., until the I$_i$ are changed during a subsequent calibration process. The I$_i$ can be changed through the use of multiple DACs for the different I$_i$, which can be slow; this can reduce power compared to using a single, high-power DAC to adjust I$_{out}$.

A common characteristic of the driver currents I$_i$ generated using the driver circuits described with respect to FIGS. 3A-3K, is that current paths of the driver currents I$_i$, through the switch network, and to the quantum computing circuit (as I$_{out}$) need not include high-attenuation attenuation blocks. For example, in some implementations, the current paths can include no attenuation, less than two times attenuation, or less than five times attenuation. This can be facilitated at least because the circuit devices described herein provide low-noise I$_i$ and I$_{out}$ directly (e.g., directly at cryogenic temperatures), while some alternative existing methods rely on generating large room-temperature currents with low noise components and passing the currents on current paths through high-attenuation attenuators (e.g., attenuators inside the cryogenic refrigerator), to obtain low-magnitude, low-noise currents that are provided to quantum devices, as described above. In some implementations described herein, these high-attenuation attenuators are not included, reducing power dissipation associated with the attenuation and improving quantum control performance.

Moreover, some implementations of the driver circuits described herein are configured to generate driver currents I$_i$ that originate at cryogenic temperatures (e.g., less than 3 K), e.g., instead of originating at room temperature and being attenuated for low-temperature operation. For example, the described front-end circuits themselves (e.g., front-end circuits/output stages 308, 320, 330, 340, 351, 361, 371, 381, 391, and 3110), at which the driver currents I$_i$ originate, can be configured for cryogenic operation, and, in some implementations, other portions of the driver circuits 300 (e.g., the DAC 306, the LDO 304, and/or the reference voltage circuit 302) can also be configured to cryogenic operation. Correspondingly, some implementations of the circuit devices described herein can be operated by generating driver currents I$_i$ that originate at cryogenic temperatures. As described above, because I$_i$ originates at cryogenic temperature with noise already close to cryogenic thermal noise, power dissipation is relatively low compared to systems that rely on a high amount of attenuation to reduce the noise from a room-temperature level in a current that originates at room temperature.

In some implementations, an operational amplifier included in the front-end circuit (e.g., operational amplifiers 314 and/or 362) is configured for low-noise operation, e.g., at low temperatures. For example, in some implementations the operational amplifier has a low-current first stage. This configuration is different from many other low-noise operational amplifier designs, in which the first stage is operated with high current in order to provide a high g$_m$ (transconductance) and, correspondingly, low input-referred noise. Some implementations according to this disclosure include operational amplifier(s) configured to reduce output-referred noise, because the operational amplifiers are operated as signal stabilizers, with signals and noise outside the operational amplifier's bandwidths (outside the amplification feedback range). As a result, noise in driver currents I$_i$ can be reduced by making the first-stage current relatively low to reduce the output-referred noise.

Figure 4:
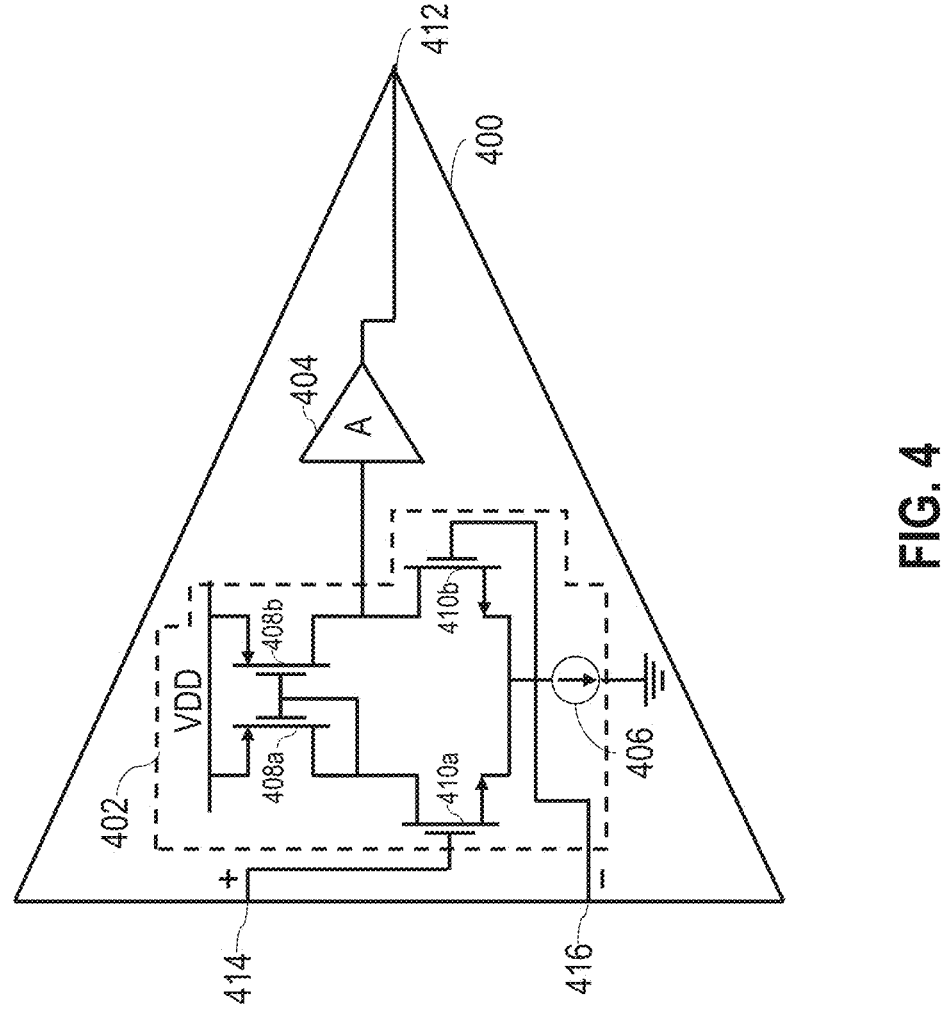
FIG. 4 is a schematic illustrating an example of an amplifier.

For example, FIG. 4 illustrates an example of an amplifier 400 that can be used as any of the amplifiers described herein, e.g., operational amplifiers 314, 362. The amplifier 400 includes an inverting input 416 and a non-inverting input 414 that feed into a first stage 402. The first stage 402 is a differential input stage that includes two sets of transistors 408a, 408b, 410a, 410b and a current source 406. In accordance with the above description of a low-current first amplifier stage, the current source 406 biases the first stage 402 with a relatively low current, e.g., less than 1 μA. An output of the first stage 402 is provided to a second amplification stage 404 (the details of which are not illustrated in FIG. 4), and an output of the second amplification stage 404 is provided at an output 412 of the amplifier 400. Based on the inclusion of amplifier(s) having low-current first stages, such as the amplifier 400, the amplifier output can be made low-noise, such that driver currents I$_i$ and the output current I$_{out}$ can also be generated with low noise, to provide more effective control of quantum devices in the quantum computing circuit 108. In some implementations, the current source 406 biases the first stage 402 with a relatively low current compared to a bias current of the second amplification stage 404, e.g., less than 10%, less than 1%, less than 0.1%, or less than 0.01% of the bias current of the second amplification stage 404.

The amplifier 400 illustrates a non-limiting example of the principle of a low-current-bias amplifier. For example, in some implementations, the amplifier is a single-stage amplifier (e.g., the second amplifier stage 404 need not be included, with the output of the first stage 402 being provided directly to the output 412), and the single stage is biased with a low current as described above.

Figure 5A:
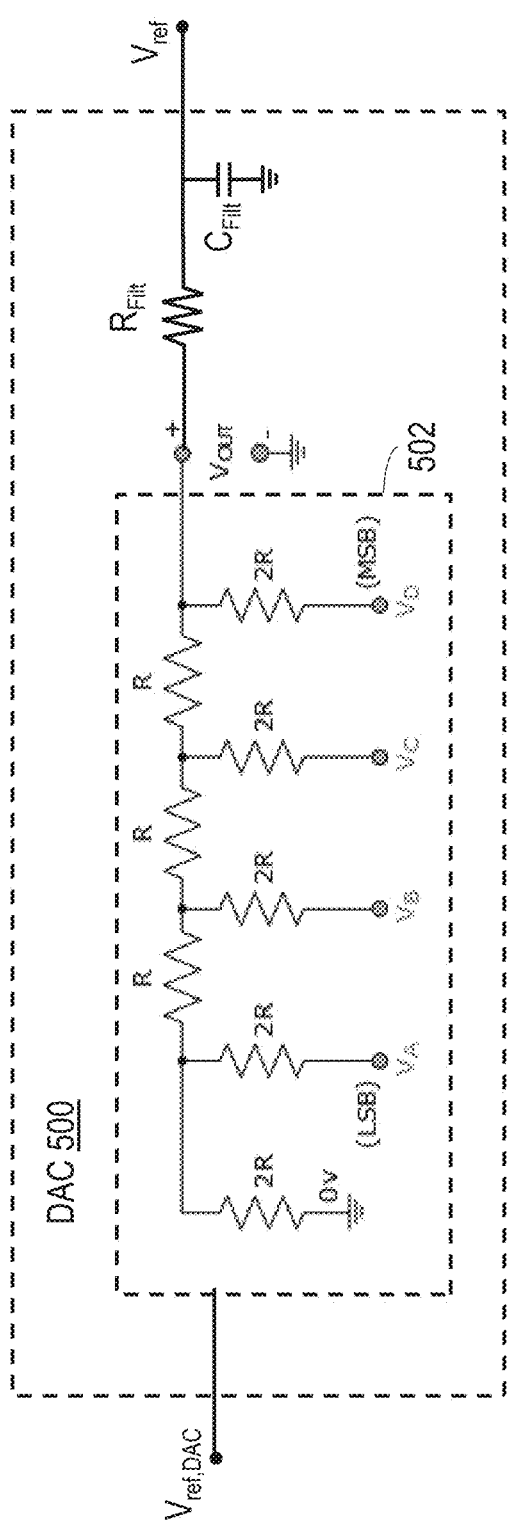
FIG. 5A is a schematic illustrating an example of a digital to analog converter (DAC).

In some implementations, a DAC (e.g., DAC 306) is configured for low-noise operation. For example, the DAC can be a resistive DAC in which output control is based on a resistor network, to obtain the benefits of resistor-dominated noise at low temperatures as described above. As shown in FIG. 5A, an example of a DAC 500 includes a resistor network 502 including coupled resistors having, in this non-limiting example, resistance values of R or 2R as illustrated, such that the DAC 500 is an R-2R DAC. In some implementations, R is between 100 kΩ and 1000 kΩ, e.g., 400 kΩ. The DAC 500 receives, as input, a reference voltage $V_{ref,DAC}$, e.g., as described in reference to FIG. 3A. Based on the reference voltage $V_{ref,DAC}$, the DAC 500 is configured and/or controlled to supply voltages $V_A$, $V_B$, $V_C$, $V_D$ based on an input digital voltage signal, the voltages $V_A$, $V_B$, $V_C$, $V_D$ corresponding to bits of a four-bit binary code representing the input digital voltage signal. As a result of this digital control, an analog representation of the input digital voltage signal is generated as $V_{out}$.

The DAC 500 further includes a low-pass filter including $R_{Filt}$ and $C_{Filt}$, which can limit a resistive noise contribution of the DAC 500 to $kT/C_{Filt}$. The DAC 500 provides, at an output node, a reference voltage $V_{ref}$, e.g., $V_{ref}$ as described in reference to various examples of FIGS. 3A-3K. An analogous DAC circuit can provide a reference current $I_{ref}$, e.g., by converting the reference voltage $V_{ref}$ to the reference current $I_{ref}$.

A resistive DAC, such as the DAC 500, can, in some cases, dissipate less power than other DAC types, e.g., a capacitive DAC or a transistor-based DAC (e.g., a current-steering DAC). This can improve power characteristics of the circuit device. In addition, the DAC 500 is compatible with low-power operation to provide low heat dissipation due to the DAC 500. For example, the relatively high R values of between 100 kΩ and 1000 kΩ in some implementations of the DAC 500 reduce the power of the DAC 500. In some cases, these relatively high R values may also reduce the speed of the DAC 500; however, high-speed operation is provided by the subsequent switch network, e.g., switch network 104.

Figure 5B:
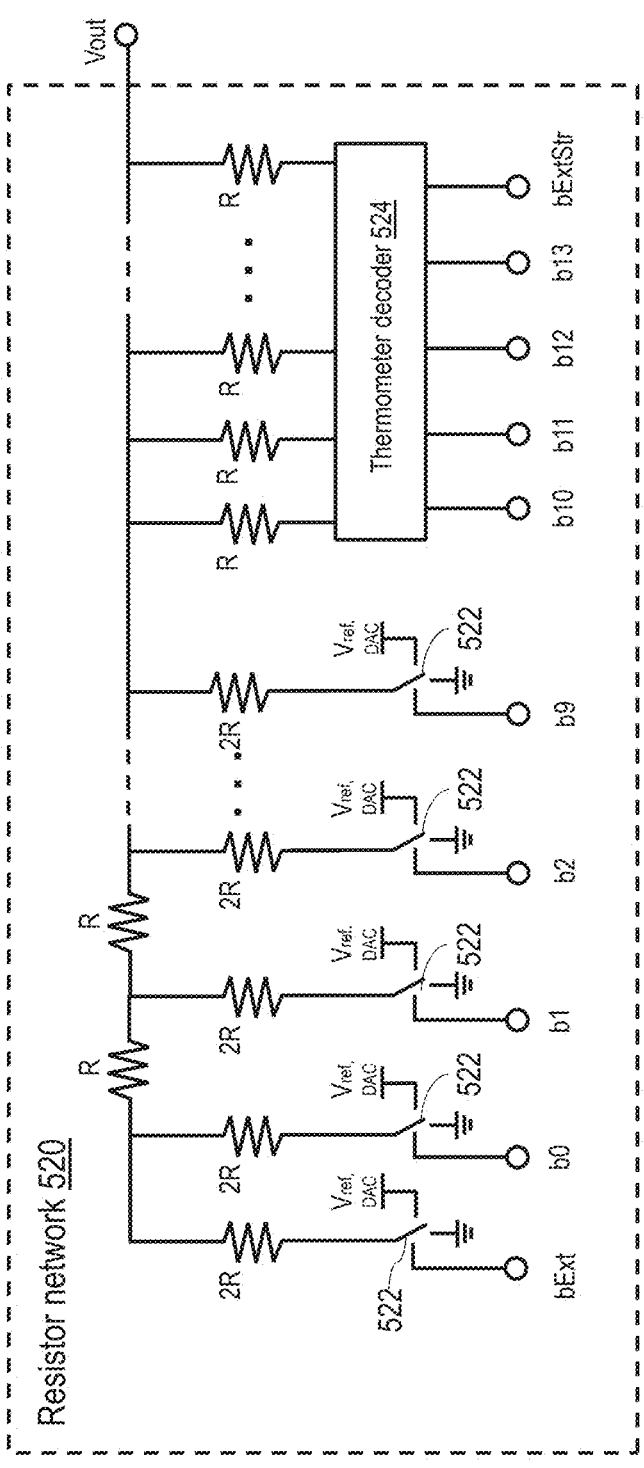
FIG. 5B is a schematic illustrating an example of a resistor network.

FIG. 5B illustrates another example of a resistor network 520, e.g., which can be used as the resistor network in the DAC 500 (e.g., in place of the resistor network 502) and other DACs within the scope of this disclosure. The resistor network 520 implements a segmentation scheme to reduce differential nonlinearity (DNL). A first portion of the resistor network 520 operates as described for the resistor network 502, with a set of switches 522, controlled based on a binary code representing a digital voltage signal, to connect to either ground (e.g., for "0") or $V_{ref,DAC}$ (e.g., for "1"), for each of b0, b1, b2 . . . b9. As described in reference to FIG. 3A, $V_{ref,DAC}$ can be provided by an LDO 304. This same switch-based method (including $V_{ref,DAC}$) can be used to control/provide the voltages $V_A$, $V_B$, $V_C$, $V_D$ of the resistor network 502. A second portion of the resistor network 520 takes, as input, further digital codes b10, b11, b12, and b13, and a thermometer decoder 524 converts these digital codes into signals that further determine $V_{out}$. Extra bits bExt and bExtStr are provided into each side of the resistor network 520.

Figure 6:
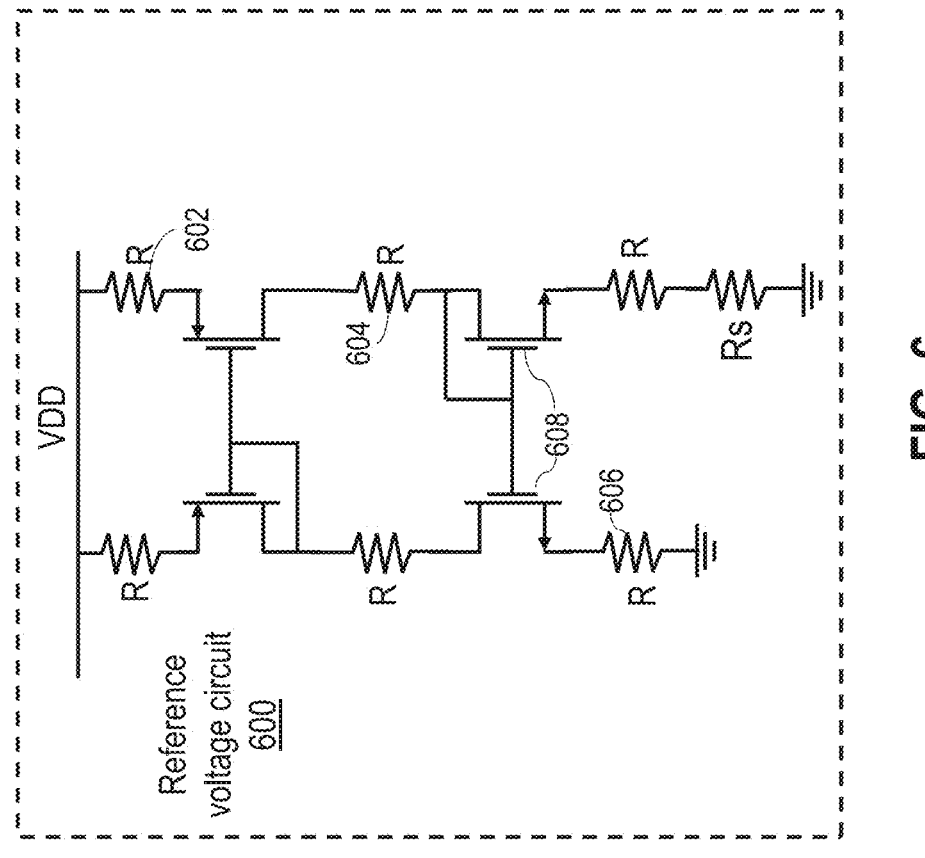
FIG. 6 is a schematic illustrating an example of a reference voltage circuit.

As described above, in some implementations, to generate low-noise $I_{out}$ and I, low-noise reference signals $V_{ref}/I_{ref}$, $V_{ref,DAC}$, and/or $V_{ref,A}$ are generated. FIG. 6 illustrates an example of a reference voltage circuit 600 that can be used to generate a reference voltage, e.g., $V_{ref,A}$. For example, the reference voltage circuit 600 can be used as the reference voltage circuit 302 of FIG. 3A. In some implementations, an output reference signal from the reference voltage circuit 600 can be taken from a further transistor (e.g., a PMOS transistor) (not shown) having a gate coupled to the gates of tranistors and a source coupled to the supply voltage VDD; the reference signal is at the drain of the transistor. To facilitate low noise in the output, the reference voltage circuit 600 implements resistor-dominated design as described with respect to FIGS. 3B-3D, with resistors R (which may have the same and/or different resistance values) arranged in series (i) between transistor source/drain nodes and a supply voltage VDD (e.g., resistor 602), (ii) between transistor source/drain nodes and other transistor source/drain nodes (e.g., resistor 604), and (iii) between transistor source/drain nodes and ground (e.g., resistor 606). As a result, noise in the generated $V_{ref,A}$ can be low.

Figure 7:
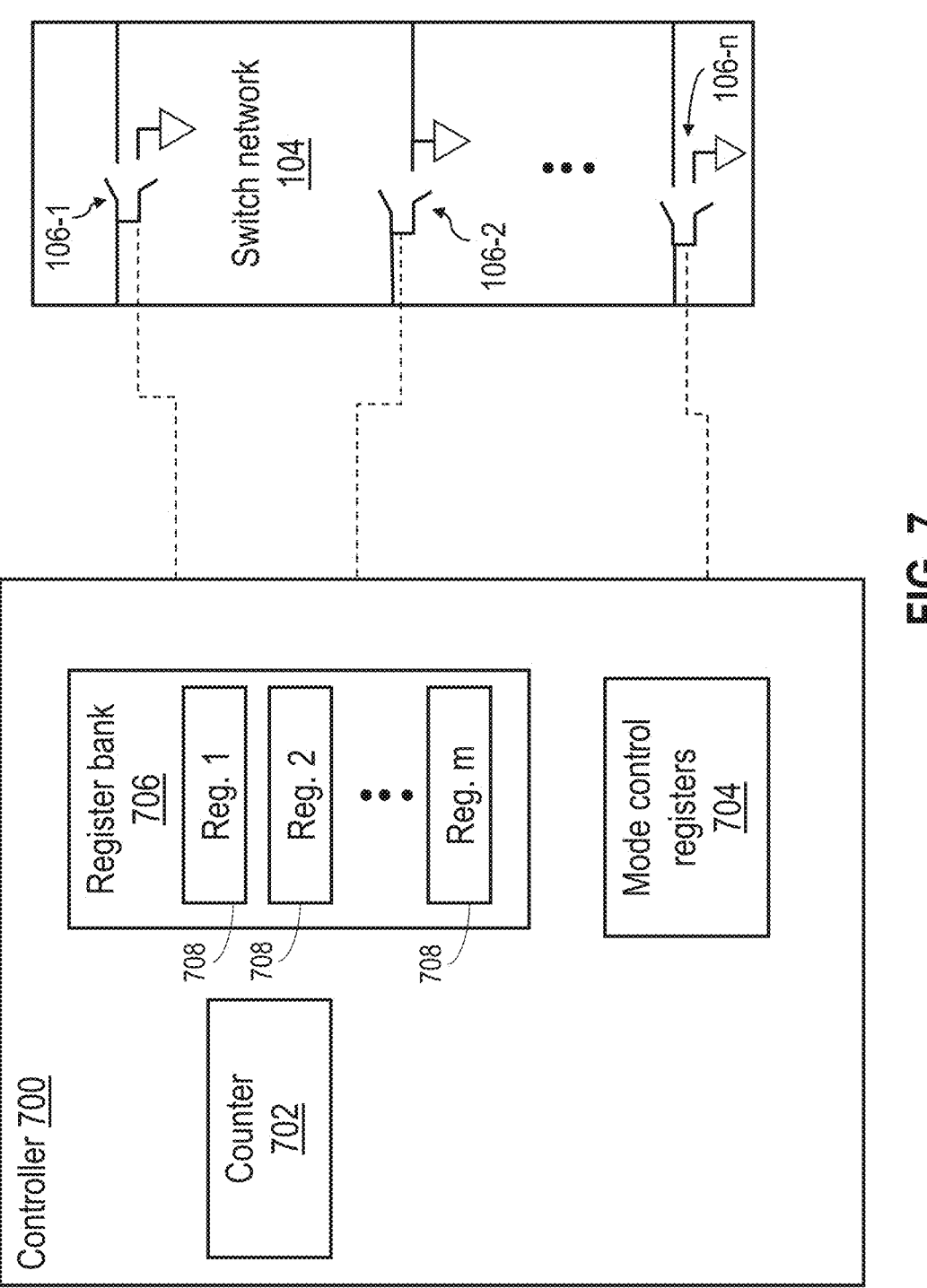
FIG. 7 is a schematic illustrating an example of a controller.

FIG. 7 illustrates an example of a controller 700 used to control the switch network 104. For example, the controller 700 can be used as the controller 110 of FIG. 1. The controller 700 includes a register bank 706 including a plurality of registers 708, a counter 702, and mode control registers 704. The mode control register 704 sets the mode of each switch 106 (e.g., coupling arrangement of a resistor included in each switch 106), e.g., active, always connected to ground, always connected to the output (where $I_{out}$ is provided), or open-ended. When a switch 106 is in the active mode, the switch 106 switches from ground-connected to output-connected in response to activation of an enable signal (e.g., an enable signal having a high value), and connects back to ground in response to de-activation of the enable signal (e.g., the enable signal having a low value). Each register 708 stores a set of registers (e.g., a word) indicating, for each clock cycle, whether each switch 106 is to receive an activated enable signal, to produce different $I_{out}$ based on different combinations of $I_i$ at different clock cycles. For example, for each clock cycle, the register 708 can indicate a combination of the switches 106 that should be open/closed during that clock cycle. As the counter 702 iterates (e.g., increases based on a clock), values of successive registers 708, corresponding to the different time-points/states of the counter 702, set different active switches 106 to ground-connected or output-connected, to specify whether driver currents $I_i$ from the corresponding driver circuits 102 are, or are not, included in the output current $I_{out}$. Other configurations of the controller 700 are within the scope of this disclosure. For example, in some implementations, switch settings are loaded into the mode control registers from another source, e.g., a distinct digital controller that need not incorporate use of the counter 702.

Figure 8:
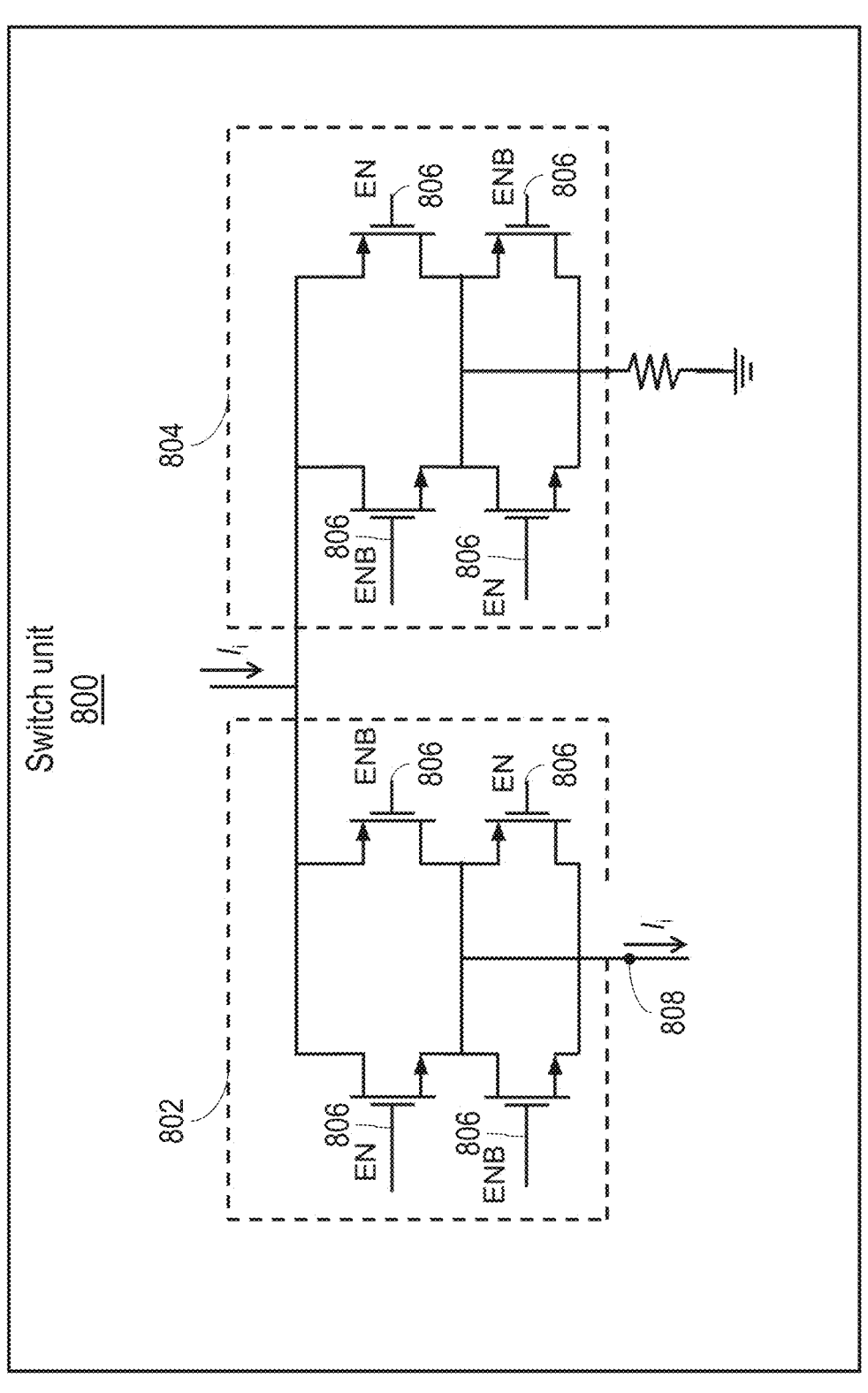
FIG. 8 is a schematic illustrating an example of a switch unit.

The controller 700, and other controllers configured to control the switch network and/or other circuits described herein (e.g., controller 110, a controller included in a DAC or distinct from a DAC to control switches to control $I_i$, a controller that controls a resistor network, e.g., to set $R_L$, and any other controller described herein), can include cryogenic circuits and/or non-cryogenic circuits. In some implementations, any of the controller described herein includes a computing system, e.g., one or more processors (e.g., microprocessors) and one or more non-transitory, computer-readable storage devices storing instructions that, when executed by the one or more processors, cause the one or more processors to perform the described control, e.g., control the switch network 104 as described herein, e.g., by causing control signals to be provided to control inputs of the switch network 104 to obtain a target $I_{out}$. In some implementations, the controller includes a microcontroller FIG. 8 illustrates an example of a switch unit 800 that can be included in some implementations of the switch network 104. For example, the switch unit 800 can be used as the switches 106. The switch unit 800 includes balanced switch networks 802, 804 that receive opposite switch commands EN, ENB. The switch commands EN, ENB (sometimes referred to as control signals) can be provided, for example, by the controller 110 through control inputs 806. Based on the switch commands EN, ENB, either the first switch network 802 or the second switch network 804 is ON and the other is OFF, to direct an input driver current $I_i$ (from one of the driver circuits 102) either to ground or to an output 808 to be included in the output current $I_{out}$. The balancing of the switch networks 802, 804 (e.g., the use of identical transistors in each switch network 802, 804, such that the switch networks 802, 804 are identical) cancels clock feedthrough and results in transistor channel charge being routed to/from ground rather than to/from the output 808, resulting in a less-noisy $I_i$ provided out of the switch unit 800.

In some implementations, the switch network 802 from which $I_i$ is provided is configured to operate in triode mode when ON based on the switch commands EN, ENB. At low temperatures, this resistance is very low, such that the static power dissipated in the switch unit 800 is also low, decreasing overall circuit device power dissipation and, in some cases, improving the reliability of operation of the quantum computing circuit 108.

For example, a controller can be configured to provide one or more first switch commands EN, ENB at the control inputs 806 to cause the driver current $I_i$ to be included in the subset of driver currents that are summed to form $I_{out}$, and can be configured to provide one or more second switch commands EN, ENB at the control inputs 806 to cause the driver current $I_i$ to be excluded from the subset of driver currents that are summed to form $I_{out}$.

The switch unit 800 can be switched very quickly, e.g., with switching times less than 2 ns, while maintaining low noise in the output $I_i$ and low power dissipation. Accordingly, the switch network that includes the switch unit 800 (e.g., switch network 104) can switch with these low switching times, e.g., can generate pulses having rise/fall times less than 2 ns.

Figure 10:
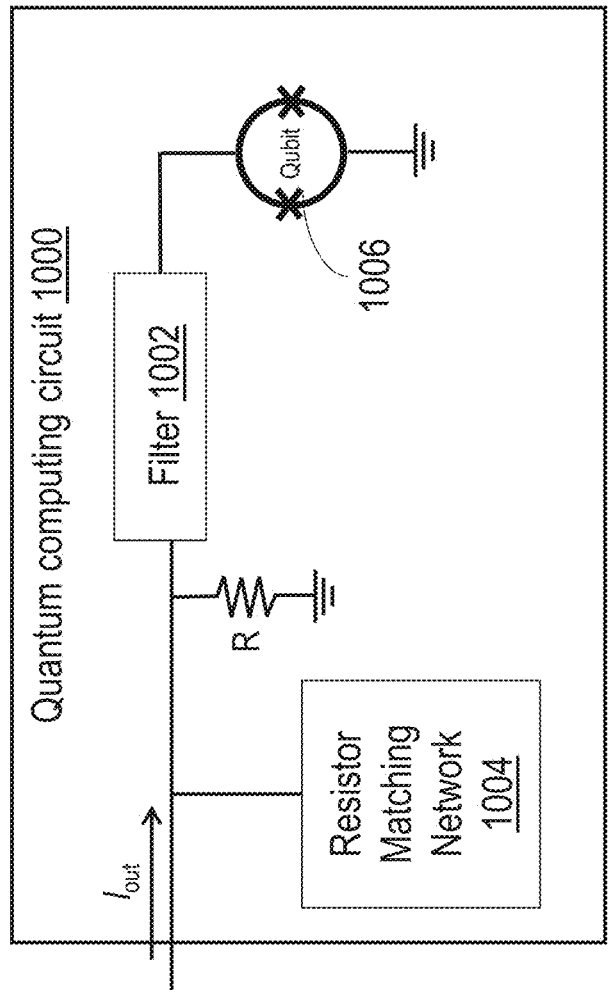
FIG. 10 is a diagram illustrating an example of a quantum computing circuit.

Based on the foregoing and other driver circuits, switch networks, and controllers, a fast-switching, low-noise $I_{out}$ is provided as input to a quantum computing circuit 108. FIG. 10 illustrates an example of a quantum computing circuit 1000 that includes a resistor R (e.g., a 50Ω resistor for impedance-matching), an optional resistance matching network 1004, an optional filter 1002, and a quantum device 1006 (in this example, a qubit 1006). The resistor R can be included in the resistance matching network 1004. The quantum computing circuit 1000 (e.g., quantum computing circuit 108 of FIG. 1) receives the output current $I_{out}$ from the switch network 104 (not shown), and the output current $I_{out}$ or a variation thereof (e.g., having undergone further filtering by the filter 1002) is provided to the qubit 1006 to control the qubit 1006 as described above.

The resistance matching network 1004 includes a set of switchable resistors that can be controlled (e.g., by the controller 110 and/or another control system) to control the output impedance of the switch network 104, e.g., to cause impedance-matching between the switch network 104 and the quantum computing circuit 1000.

The filter 1002 can include any active and/or passive filters of one or more types, such as low-pass, high-pass, band-pass, and/or band-reject filter(s). The filter 1002 can further remove noise from the output current $I_{out}$ to improve the reliability of control of the qubit 1006. In some implementations, the filter 1002 has a bandwidth of 250 MHz.

The qubit 1006 can include any type of qubit, e.g., a charge qubit (e.g., a transmon, Xmon, or gatemon), a flux qubit, or a phase qubit. As described above, the circuit device including the quantum computing circuit 1000 can be configured for operation at cryogenic temperatures, and the qubit can be a superconductor qubit. $I_{out}$, or a variation thereof, can couple to the qubit 1006, e.g., by flowing through the qubit or by generating a magnetic flux that couples to the qubit 1006, to control the qubit 1006. For example, $I_{out}$, or the variation thereof, can be a Z control signal that sets a frequency of the qubit 1006. Accordingly, the qubit 1006 can be set to frequencies compatible with desired qubit operations (e.g., to determine which component(s) the qubit 1006 will couple with), e.g., single-qubit gate operation, two-qubit gate operation, read operation, or reset operation.

The quantum computing circuit 1000 can instead, or additionally, include one or more other types of quantum device. For example, the quantum device controlled by the output current $I_{out}$ can be a quantum coupler, such as a superconducting quantum interference device (SQUID), e.g., a DC-SQUID and/or an RF-SQUID, or a tunable quantum bus (e.g., a microwave cavity). $I_{out}$, or the variation thereof, can be ag control signal that sets a degree of coupling between the quantum coupler and one or more other couplers and/or qubits.

Based on target operation modes of the quantum device (e.g., target frequencies of the qubit 1006), the controller (e.g., controller 110 or controller 700) can be configured to control the switch network 104 to switch between the target operation modes. For example, the controller can be configured to provide, to the switch network 104, control signals that adjust switches of the switch network 104 to set $I_{out}$ to cause the qubit 1006 to have a target frequency corresponding to a qubit operation described above, and/or another type of qubit operation. As another example, the controller can be configured to provide, to the switch network 104, control signals that adjust switches of the switch network 104 to set $I_{out}$ to cause a quantum coupler of the quantum computing circuit 108 to have a target frequency corresponding to a particular target coupling.

In the foregoing description, transistors included in the various described circuits can include semiconductor FETs, e.g., silicon FETs, germanium FETs, silicon-germanium FETs, and/or any other type of semiconductor transistor. It will be understood that examples that include NMOS transistors can be adapted to instead or additionally include PMOS transistors, and vice-versa, without departing from the scope of this disclosure. Resisters included in the various described circuits can include resistive films/portions of semiconductor and/or another materials, e.g., polySi resistors. Capacitors included in the various described circuits can include metal capacitors, e.g., including a metal film formed on a substrate. Other device types, materials, and structures are also within the scope of this disclosure.

Based on the circuitry of the circuit devices described herein, the circuit devices can exhibit low supply sensitivity. For example, in some implementations, supply voltage noise (e.g., Vn in a total supply voltage VDD+Vn) is attenuated in the generated output current $I_{out}$ by a factor of at least $3 \cdot 10^7$, e.g., $I_{out}$ includes a supply-noise component $I_n$, and $I_n < Vn / (3 \cdot 10^7)$.

In addition, based on the circuitry of the circuit devices described herein, a synergistic result is obtained to improve control of the quantum computing circuit 108. The high-speed, low-power, low-noise switch network is controlled to output an adjustable $I_{out}$ based on multiple low-noise driver currents $I_i$, which can be treated as constant for purposes of pulse generation using $I_{out}$. The driver currents $I_i$ (e.g., based on the described front-end circuits and amplifiers) can be generated with low noise, at cryogenic temperatures, and with little dissipation, such that the associated power dissipation is low. As a result of these combined effects, quantum device(s) in the quantum computing circuit 108 can be controlled reliably and quickly.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A circuit device, comprising:
a plurality of driver circuits, each driver circuit configured to output a respective current;
a switch network comprising:
a plurality of switch network inputs, wherein each switch network input of the plurality of switch network inputs is coupled to an output of a respective driver circuit of the plurality of driver circuits to receive the respective current from the respective driver circuit,
a switch network output,
one or more control inputs, and
a plurality of switches,
wherein the switch network is configured to, based on one or more control signals at the one or more control inputs, adjust one or more switches of the plurality of switches to provide, at the switch network output, an output signal comprising a sum of a subset of the currents from the plurality of driver circuits, the subset of the currents corresponding to the one or more control signals; and
a quantum computing circuit coupled to the switch network output to receive the output signal.

2. The circuit device of claim 1, wherein the switch network is configured to
in response to one or more first control signals at the one or more control inputs, set a first switch of the plurality of switches to a first configuration to include a first current, from a first driver circuit of the plurality of driver circuits, in the subset of the currents, and
in response to one or more second control signals at the one or more control inputs, set the first switch to a second configuration to exclude the first current from the subset of the currents.

3. The circuit device of claim 2, wherein a switching time for switching between the first configuration and the second configuration is less than 2 ns.

4. The circuit device of claim 1, wherein the switch network is configured to:
in response to one or more control signals at the one or more control inputs, adjust the one or more switches of the plurality of switches to generate, as the output signal, a pulse having a rise time or fall time less than 2 ns.

5. The circuit device of claim 4, wherein the plurality of driver circuits and the switch network are configured to generate the pulse based on DC currents from the plurality of driver circuits.

6. The circuit device of claim 1, wherein the plurality of driver circuits and the switch network are configured to, when operated at a cryogenic temperature, provide the output signal with a noise component less than $1 \cdot 10^{-5}$ times a total value of the output signal.

7. The circuit device of claim 1, wherein at least two driver circuits of the plurality of driver circuits comprise a respective digital to analog converter (DAC).

8. The circuit device of claim 1, wherein a first driver circuit of the plurality of driver circuits is configured to, when operated at a cryogenic temperature, output a respective current having a dominant noise component associated with a resistance of the first driver circuit.

9. The circuit device of claim 1, wherein the quantum computing circuit comprises a qubit arranged to receive a magnetic flux associated with the output signal.

10. The circuit device of claim 9, comprising a controller coupled to the one or more control inputs,
wherein the controller is configured to provide, at the one or more control inputs, control signals that cause the switch network to adjust the one or more switches to switch between:
a first setting in which the output signal comprises a sum of a first subset of the currents, the first setting causing the qubit to have a first frequency associated with single-qubit gate operation,
a second setting in which the output signal comprises a sum of a second subset of the currents, the second setting causing the qubit to have a second frequency associated with two-qubit gate operation,
a third setting in which the output signal comprises a sum of a third subset of the currents, the third setting causing the qubit to have a third frequency associated with qubit readout, and
a fourth setting in which the output signal comprises a sum of a fourth subset of the currents, the fourth setting causing the qubit to have a fourth frequency associated with qubit reset.

11. The circuit device of claim 9, wherein the quantum computing circuit comprises a filter coupled between the qubit and the switch network output.

12. The circuit device of claim 1, wherein a first switch of the plurality of switches comprises a pair of balanced switch networks.

13. The circuit device of claim 1, wherein a first driver circuit of the plurality of driver circuits comprises a plurality of programmable current sources,
wherein the respective current output by the first driver circuit comprises a combination of respective outputs from the plurality of programmable current sources.

14. The circuit device of claim 1, wherein a first driver circuit of the plurality of driver circuits comprises:
a low dropout (LDO) regulator circuit configured to output a reference voltage;
a programmable digital to analog converter (DAC) circuit configured to generate a reference signal based on the reference voltage; and
a front-end circuit configured to receive the reference signal and output the respective current from the first driver circuit based on the reference signal.

15. The circuit device of claim 14, wherein the DAC circuit is configured to generate a reference current as the reference signal, and
wherein the front-end circuit is configured such that the respective current from the first driver circuit varies with varying values of the reference current.

16. The circuit device of claim 14, wherein the front-end circuit comprises at least one switch, and wherein a signal from the DAC circuit or a controller distinct from the DAC circuit adjusts a configuration of the at least one switch.

17. The circuit device of claim 14, wherein the front-end circuit comprises:

a transistor, and at least one resistor coupled directly to a source terminal or a drain terminal of the transistor.

18. The circuit device of claim 17, wherein the front-end circuit comprises a capacitor coupled between (i) the source terminal or the drain terminal and (ii)

a ground terminal, or a gate terminal of the transistor.

19. The circuit device of claim 14, wherein the front-end circuit comprises:

a first sub-block coupled between the DAC circuit and a supply voltage, wherein the reference signal comprises a current between the first sub-block and the DAC circuit, and a second sub-block coupled between the supply voltage and a front-end circuit output terminal, wherein the second sub-block is configured to output the respective current from the first driver circuit at the front-end circuit output terminal, wherein a gate terminal of a transistor of the second sub-block is arranged to receive a signal from the first sub-block.

20. The circuit device of claim 14, wherein the front-end circuit comprises:

an output line on which the respective current from the first driver circuit is output, and a resistor on the output line.

21. The circuit device of claim 20, comprising an adjustable resistor network on the output line, the adjustable resistor network comprising the resistor.

22. The circuit device of claim 14, wherein the front-end circuit comprises an operational amplifier comprising a first stage and a second stage, wherein the first stage of the operational amplifier comprises a current source that biases the first stage with a current less than 1 µA.

23. The circuit device of claim 18, wherein the DAC circuit comprises a resistive DAC.

24. The circuit device of claim 18, wherein the front-end circuit comprises a plurality of output stages, each output stage configured to output a respective first current, and wherein the DAC circuit is configured to generate the reference signal to select a subset of the plurality of output stages to generate the respective current from the first driver circuit, the respective current from the first driver circuit comprising a sum of the respective first currents of the subset of the plurality of output stages.

25. The circuit device of claim 1, wherein the quantum computing circuit comprises an adjustable resistor network coupled to the switch network output.

26. The circuit device of claim 1, wherein a current path from the plurality of driver circuits to the quantum computing circuit has less than five times current attenuation.

27. The circuit device of claim 1, wherein the respective currents from the plurality of driver circuits originate at a cryogenic temperature.

\* \* \* \* \*